(12) United States Patent
Perlmutter et al.

(10) Patent No.: US 7,835,570 B1
(45) Date of Patent: Nov. 16, 2010

(54) REDUCING DIFFERENTIAL RESOLUTION OF SEPARATIONS

(75) Inventors: Keren O. Perlmutter, Pacific Palisades, CA (US); Sharon M. Perlmutter, Pacific Palisades, CA (US); Eric Wang, Tustin, CA (US); Paul R. Klamer, La Canada, CA (US)

(73) Assignees: Warner Bros. Entertainment Inc., Burbank, CA (US); AOL Inc., Dulles, VA (US)

( * ) Notice: Subject to any disclaimer, the term of this patent is extended or adjusted under 35 U.S.C. 154(b) by 1012 days.

(21) Appl. No.: 11/608,556

(22) Filed: Dec. 8, 2006

Related U.S. Application Data

(63) Continuation of application No. 11/206,182, filed on Aug. 18, 2005, now Pat. No. 7,218,793, which is a continuation of application No. 10/657,243, filed on Sep. 9, 2003, now Pat. No. 6,947,607, and a continuation of application No. 10/657,138, filed on Sep. 9, 2003, now Pat. No. 6,956,976, said application No. 10/657,243 and a continuation-in-part of application No. 10/035,337, filed on Jan. 4, 2002, now Pat. No. 7,092,584.

(60) Provisional application No. 60/434,650, filed on Dec. 20, 2002.

(51) Int. Cl.
*G06T 5/00* (2006.01)
(52) U.S. Cl. .................. 382/162; 382/266; 382/275; 348/625
(58) Field of Classification Search .......... 382/162, 382/191, 195, 199, 254, 266, 275, 284, 299; 348/96, 97, 576, 577, 612, 625; 352/66, 352/67
See application file for complete search history.

(56) References Cited

U.S. PATENT DOCUMENTS 4,171,871 A    10/1979   Dill et al. .................. 350/199

(Continued)

FOREIGN PATENT DOCUMENTS

JP          61-231557 A    10/1986

(Continued)

OTHER PUBLICATIONS

Japanese Office Action issued in Japanese Application No. 2003-559159, mailed Jun. 9, 2009, 4 pages.
Boult, T.E., and Wolberg, G., "Correcting Chromatic Aberrations Using Image Warping," *Proceedings of DARPA92*, pp. 363-377, 1992.
Brown, Lisa G., "A Survey of Image Registration Techniques," *ACM Computing Surveys*, vol. 24, No. 4, pp. 325-376, 1992.

(Continued)

*Primary Examiner*—Andrew W Johns
(74) *Attorney, Agent, or Firm*—Fish & Richardson P.C.

(57) ABSTRACT

Certain disclosed implementations use digital image processing to reduce the differential resolution among separations or images in film frames, such as, for example, red flare. A location in the red image may be selected using information from another image. The selected location may be modified using information from that other image. The selection may include comparing features of an edge in the first image with features of a corresponding edge in the other image. The modification may include performing wavelet transformations of the two images and copying certain coefficients (or a function of these coefficients) produced by the application of the transformation to the second image to the coefficients produced by the application of the transformation to the first image. The copied coefficients may be correlated with the selected location. Other disclosed techniques vary from the above and may be applied to other fields.

26 Claims, 14 Drawing Sheets

U.S. PATENT DOCUMENTS

| | | | |
|---|---|---|---|
| 4,285,004 A | 8/1981 | Morrison et al. | 358/10 |
| 4,320,414 A | 3/1982 | Miyaji et al. | 358/51 |
| 4,541,688 A | 9/1985 | Watt et al. | 350/171 |
| 4,641,244 A | 2/1987 | Wilson et al. | 364/475 |
| 4,783,591 A | 11/1988 | Sullivan | 250/227 |
| 4,849,914 A | 7/1989 | Medioni et al. | 364/526 |
| 4,890,160 A | 12/1989 | Thomas | 358/105 |
| 4,924,521 A | 5/1990 | Dinan et al. | 382/54 |
| 5,022,089 A | 6/1991 | Wilson | 382/44 |
| 5,023,815 A | 6/1991 | Wilson et al. | 364/526 |
| 5,315,413 A | 5/1994 | Yamamoto et al. | 358/512 |
| 5,325,190 A | 6/1994 | Nagasaki et al. | 348/270 |
| 5,414,782 A | 5/1995 | Carasso | 382/270 |
| 5,418,574 A | 5/1995 | Miyabata et al. | 348/625 |
| 5,475,428 A | 12/1995 | Hintz et al. | 348/263 |
| 5,485,203 A | 1/1996 | Nakamura et al. | 348/263 |
| 5,517,234 A | 5/1996 | Gerber et al. | 348/126 |
| 5,548,326 A | 8/1996 | Michael | 348/87 |
| 5,608,466 A | 3/1997 | Nakamoto | 348/587 |
| 5,608,864 A | 3/1997 | Bindlish et al. | 395/507 |
| 5,627,918 A | 5/1997 | Carasso | 382/254 |
| 5,630,037 A | 5/1997 | Schindler | 395/131 |
| 5,640,200 A | 6/1997 | Michael | 382/87 |
| 5,641,596 A | 6/1997 | Gray et al. | 430/21 |
| 5,777,799 A | 7/1998 | Miyauchi | 359/689 |
| 5,781,666 A | 7/1998 | Ishizawa et al. | 382/284 |
| 5,812,214 A | 9/1998 | Miller | 348/587 |
| 5,917,987 A | 6/1999 | Neyman | 386/42 |
| 6,002,434 A | 12/1999 | Topper | 348/263 |
| 6,017,688 A | 1/2000 | Edgar | 430/470 |
| 6,069,714 A | 5/2000 | Edgar | 358/487 |
| 6,075,905 A | 6/2000 | Herman et al. | 382/284 |
| 6,115,071 A | 9/2000 | Hurst, Jr. et al. | 348/415 |
| 6,128,046 A | 10/2000 | Totsuka et al. | 348/590 |
| 6,144,498 A | 11/2000 | Bryars et al. | 359/634 |
| 6,169,562 B1 | 1/2001 | Morimoto | 347/232 |
| 6,195,132 B1 | 2/2001 | Kimura et al. | 348/618 |
| 6,266,452 B1 | 7/2001 | McGuire | 382/294 |
| 6,282,326 B1 | 8/2001 | Lee et al. | 382/289 |
| 6,295,083 B1 | 9/2001 | Kuhn | 348/190 |
| 6,317,223 B1 | 11/2001 | Rudak et al. | 358/275 |
| 6,323,934 B1 | 11/2001 | Enomoto | 355/40 |
| 6,345,130 B1 | 2/2002 | Dahl | 382/286 |
| 6,373,970 B1 | 4/2002 | Dong et al. | 382/128 |
| 6,393,150 B1 | 5/2002 | Lee et al. | 382/176 |
| 6,393,160 B1 | 5/2002 | Edgar | 382/275 |
| 6,400,996 B1 | 6/2002 | Hoffberg et al. | 700/83 |
| 6,407,824 B2 | 6/2002 | Waldern et al. | 345/8 |
| 6,414,693 B1 | 7/2002 | Berger et al. | 345/641 |
| 6,427,020 B1 | 7/2002 | Rhoads | 382/100 |
| 6,445,816 B1 | 9/2002 | Pettigrew | 382/162 |
| 6,449,414 B1 | 9/2002 | Tahara et al. | 385/120 |
| 6,470,147 B1 | 10/2002 | Imada | 396/55 |
| 6,475,711 B1 | 11/2002 | Cook et al. | 430/363 |
| 6,477,270 B1 | 11/2002 | Wu | 382/167 |
| 6,477,279 B2 | 11/2002 | Go | 382/240 |
| 6,549,576 B1 | 4/2003 | Moriyoshi | 375/240.16 |
| 6,587,509 B1 | 7/2003 | Suzuki et al. | 375/240.29 |
| 6,610,387 B1 | 8/2003 | Torii et al. | 428/195 |
| 6,611,598 B1 | 8/2003 | Hayosh | 380/54 |
| 6,713,242 B2 | 3/2004 | Burtin | 430/401 |
| 6,765,609 B1 | 7/2004 | Kinoshita | 348/222.1 |
| 6,816,604 B2 | 11/2004 | Young, Jr. et al. | 382/112 |
| 6,870,564 B1 | 3/2005 | Burns | 348/263 |
| 6,947,607 B2 | 9/2005 | Perlmutter et al. | 382/266 |
| 6,956,607 B2 | 10/2005 | Mizuno et al. | 348/308 |
| 7,011,727 B2 | 3/2006 | Torii et al. | 156/230 |
| 2001/0030697 A1 | 10/2001 | Dischert et al. | 348/263 |
| 2002/0106133 A1 | 8/2002 | Edgar et al. | 382/261 |
| 2002/0146171 A1 | 10/2002 | Chandrasekhar | 382/181 |

FOREIGN PATENT DOCUMENTS

| | | |
|---|---|---|
| JP | 63-182961 A | 7/1988 |
| JP | 02-501417 A | 5/1990 |
| JP | 2000-236552 A | 8/2000 |
| WO | 89/03051 A1 | 4/1989 |

OTHER PUBLICATIONS

Li, H., et al., "A Contour-Based Approach to Multisensor Image Registration," *IEEE Transactions on Image Processing*, vol. 4, No. 3, Mar. 1995, pp. 320-334.

Canny, John, "A Computational Approach to Edge Detection," *IEEE Tranactions on Pattern Analysis and Machine Intelligence*, vol. PAMI-8, No. 6, Nov. 1986, pp. 679-698.

Srinivasan, S., et al., "*mist*: Multispectral Image Similarity Transformation," *LNK Home Page*, pp. 1-20, printed Dec. 12, 2001.

Spencer, G., et al., "Physically-Based Glare Effects for Digital Images," *SIGGRAPH 95 Conference Proceedings*, Annual Conference Series, ACM SIGGRAPH, Aug. 1995, pp. 325-334.

Polikar, Robi, "Fundamental Concepts & an Overview of the Wavelet Theory," *The Wavelet Tutorial Part I*, Rowan University, College of Engineering Web Servers, Jun. 5, 1996, 15 pages, reprinted from http://engineering.rowan.edu/~polikar/WAVELETS/Wtpart1.html on Nov. 21, 2002.

Polikar, Robi, "Fundamentals: The Fourier Transform and the Short Term Fourier Transform," *The Wavelet Tutorial Part 2*, Rowan University, College of Engineering Web Servers, 17 pages, reprinted from http://engineering.rowan.edu/~polikar/WAVELETS/Wtpart2.html on Nov. 21, 2002.

Polikar, Robi, "Multiresolution Analysis & the Continuous Wavelet Transform," *The Wavelet Tutorial Part III*, Rowan University, College of Engineering Web Servers, 28 pages, reprinted from http://engineering.rowan.edu/~polikar/WAVELETS/Wtpart1.html on Nov. 21, 2002.

Polikar, Robi, "Multiresolution Analysis: The Discrete Wavelet Transform," *The Wavelet Tutorial Part IV*, Rowan University, College of Engineering Web Servers, 10 pages, reprinted from http://engineering.rowan.edu/~polikar/WAVELETS/Wtpart1.html on Nov. 21, 2002.

"The Wide Screen Time Machine: Mechanix Illustrated Mar. 1939, How the Technicolor Camera Works," reprinted from http://www.widescreenmuseum.com/widescreen/mi-techcamera.htm, on Dec. 18, 2002, 3 pages.

"Technicolor," reprinted from http://www.everything2.com/index.pl?node=Technicolor, on Dec. 18, 2002, 3 pages.

Ball, J.A., "The Technicolor Process of Three-Color Cinematography," *Journal of Motion Picture Engineers*, vol. XXV, No. 2, Aug. 1935, pp. 127-138.

"Increased Demand for Digital Images," Digital ICE Applied Science Fiction, reprinted from http://www.asf.com/products/ice/FilmICEOverview.shtml on Apr. 15, 2003, 2 pages.

"Digital ICE—Film Scanner Technology," Digital ICE Applied Science Fiction, reprinted from http://www.asf.com/products/ice/FilmICEExample.shtml on Apr. 15, 2003, 2 pages.

"Announcing the End of Dirty Images," Digital ICE Applied Science Fiction, reprinted from http://www.asf.com/products/ice/FilmICESpecs.shtml on Apr. 15, 2003, 3 pages.

"Digital ICE for Film Scanners: Frequently Asked Questions," Digital ICE Applied Science Fiction, reprinted from http://www.asf.com/support/scanners/FilmICEFAQs.shtml on Apr. 15, 2003, 2 pages.

"Automatically Eliminates Surface Defects," Digital ICE Applied Science Fiction, reprinted from http://www.asf.com/gallery/ice/film/ on Apr. 15, 2003, 1 page.

"Chromatic Aberration" reprinted from http://www.yorku.ca/eye/chraber.htm on Nov. 21, 2002, 1 page.

Askey, P., "Chromatic Aberrations," *DPReview.Com*, © 1998-2001, reprinted from http://www.dpreview.com/learn/Glossary/Optical/Chromatic_Aberrations_01.html on Nov. 21, 2002, 3 pages.

"Chromatic Abberation," reprinted from http://hyperphysics.phy-astr.gsu.edu/hbse/geoopt/aber2.html on Nov. 21, 2002, 3 pages.

"Aberrations," reprinted from http://hyperphysics.phy-astr.gsu.edu/hbase/geoopt/aberrcon.html on Nov. 21, 2002, 2 pages.

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   |   |
| 1 |   |   |   |   |   | M | M | M | M | PM |
| 2 |   |   |   |   |   |   |   |   |   |   |
| 3 |   | M | M | M |   |   |   |   |   |   |
| 4 |   |   |   |   |   |   |   |   |   |   |
| 5 |   |   |   |   |   |   |   |   |   |   |
| 6 |   |   |   |   |   |   |   | PM | PM |   |
| 7 |   |   |   |   |   |   |   |   |   |   |
| 8 |   |   |   | NM | NM |   |   |   |   |   |
| 9 |   |   |   |   |   |   |   |   |   |   |

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   |   |
| 1 |   |   |   |   |   | M | M | M | M | PM |
| 2 |   |   |   |   | M |   |   |   |   |   |
| 3 |   | M | M | M |   |   |   |   |   |   |
| 4 |   |   |   |   |   |   |   |   |   |   |
| 5 |   |   |   |   |   |   |   |   |   |   |
| 6 |   |   |   |   |   |   |   | PM | PM |   |
| 7 |   |   |   |   |   |   |   |   |   |   |
| 8 |   |   |   |   |   |   |   |   |   |   |
| 9 |   |   |   |   |   |   |   |   |   |   |

|   | 0 | 1 | 2 | 3 | 4 | 5 | 6 | 7 | 8 | 9 |
|---|---|---|---|---|---|---|---|---|---|---|
| 0 |   |   |   |   |   | ▨ | ▨ | ▨ | ▨ | ▨ |
| 1 |   |   |   |   | ▨ | M | M | M | M | PM |
| 2 |   | ▨ | ▨ | ▨ | M | ▨ | ▨ | ▨ | ▨ | ▨ |
| 3 |   | M | M | M | ▨ | ▨ | ▨ | ▨ | ▨ | ▨ |
| 4 |   | ▨ | ▨ | ▨ | ▨ | ▨ | ▨ | ▨ | ▨ | ▨ |
| 5 |   | ▨ | ▨ | ▨ | ▨ |   |   |   |   |   |
| 6 |   | ▨ | ▨ | ▨ |   |   |   |   |   |   |
| 7 |   |   |   |   |   |   |   |   |   |   |
| 8 |   |   |   |   |   |   |   |   |   |   |
| 9 |   |   |   |   |   |   |   |   |   |   |

|   | 0 | 1 | 2 | 3 | 4 | 5 | 6 | 7 | 8 | 9 |
|---|---|---|---|---|---|---|---|---|---|---|
| 0 |   |   |   |   |   | M | M | M | M | M |
| 1 |   |   |   |   | M | M | M | M | M | M |
| 2 |   | M | M | M | M | M | M | M | M | M |
| 3 |   | M | M | M | M | M | M | M | M | M |
| 4 |   | M | M | M | M | M | M | M | M | M |
| 5 |   | M | M | M | M |   |   |   |   |   |
| 6 |   | M | M | M |   |   |   |   |   |   |
| 7 |   |   |   |   |   |   |   |   |   |   |
| 8 |   |   |   |   |   |   |   |   |   |   |
| 9 |   |   |   |   |   |   |   |   |   |   |

|          | 0 | 1 | 2 | 3 | 4 | 5 | 6 | 7 | 8 | 9 | 10 | 11 | 12 | 13 | 14 | 15 |
|----------|---|---|---|---|---|---|---|---|---|---|----|----|----|----|----|----|
| Row x    |   | M | M | M | M | M | M |   |   | M |    |    |    |    |    |    |
| Subband 4 | 0 |   | 1 |   | 2 |   | 3 |   | 4 |   | 5  |    | 6  |    | 7  |    |
| Subband 3 | 0 |   |   |   | 1 |   |   |   | 2 |   |    |    | 3  |    |    |    |
| Subband 2 | 0 |   |   |   |   |   |   |   | 1 |   |    |    |    |    |    |    |
| Subband 1 | 0 |   |   |   |   |   |   |   |   |   |    |    |    |    |    |    |
| Subband 0 | 0 |   |   |   |   |   |   |   |   |   |    |    |    |    |    |    |

Column i

| | Type | M1$_R$ | R | G | B |
|---|---|---|---|---|---|
| j | NM | 130 | 130 | 130 | 120 |
| j+1 | M | 90 | 128 | 127 | 118 |
| j+2 | M | 95 | 125 | 130 | 116 |
| j+3 | M | 97 | 118 | 129 | 117 |
| j+4 | NM | 115 | 115 | 128 | 120 |

FIG. 16

REDUCING DIFFERENTIAL RESOLUTION OF SEPARATIONS

CROSS-REFERENCE TO RELATED APPLICATIONS

This application claims priority from and is a continuation of U.S. application Ser. No. 11/206,182, filed Aug. 18, 2005, now U.S. Pat. No. 7,218,793, and titled "Reducing Differential Resolution of Separations," which is a continuation of (1) U.S. application Ser. No. 10/657,243, filed Sep. 9, 2003, now U.S. Pat. No. 6,947,607, and titled "Reduction of Differential Resolution of Separations," and (2) U.S. application Ser. No. 10/657,138, filed Sep. 9, 2003, now U.S. Pat. No. 6,956,976, and titled "Reduction of Differential Resolution of Separations," both of which claim priority from and are continuations-in-part of U.S. application Ser. No. 10/035,337, filed Jan. 4, 2002, now U.S. Pat. No. 7,092,584, and titled "Registration of Separations," and claim priority from U.S. Provisional Application No. 60/434,650, filed Dec. 20, 2002, and titled "Reduction of Differential Resolution of Separations." All of the above-identified applications are incorporated herein by reference in their entirety.

TECHNICAL FIELD

Certain disclosed systems relate generally to image processing, and more particularly to the reduction of distortion that is manifested from separations with different resolutions.

BACKGROUND

Color motion picture film is a relatively recent development. Before the advent of color film stock in the 1950s, a process for making color motion pictures included capturing color information on two or more reels of black and white film. In the original Technicolor three-color film separation process, three reels of black and white film were loaded into a specially-designed movie camera. The light coming through the lens was split into the three primary colors of light and each was recorded on a separate reel of black and white film. After developing the three reels, three photographic negatives were created representing the yellow (inverted blue), the cyan (inverted red), and the magenta (inverted green) portions of the original scenes.

In addition to the creation of color separations through the original Technicolor process, color separations also have been produced and used for the archival of color film because black and white film stock generally has a much greater shelf-life than color film. In this process, the color film stock is used to expose one reel of black and white film with sequential records of red, green, and blue so that each frame is printed three times on the resultant reel to form a sequential separation.

Film studios may recombine the three color separations onto a single reel of color film using a photographic process that is performed in a film laboratory. In the case of three color separations that are each located on a separate reel, an optical film printer is employed to resize and reposition each source reel, one at a time. In particular, three passes are made. First, the magenta source reel is projected through an appropriate color filter onto the destination reel. Thereafter, the destination reel is rewound, the next source reel is loaded and resized, and the color filter is changed. The process is repeated until all three color separations have been printed on the single destination reel using the optical film printer. The resulting destination reel is called an interpositive ("IP"), and the colors are now represented as red, green, and blue (as opposed to cyan, magenta, and yellow).

The Technicolor three-color film separation process, as well as other processes, is subject to a variety of film distortions, including, for example, differential resolution. Differential resolution may arise because, for example, the nature of the light path and lens coatings in the Technicolor cameras typically cause the three film separations to have drastically different resolution or sharpness. The cyan filter typically is located behind the yellow filter in what is known as a bipack arrangement. Light that passes through the yellow filter is filtered and, unfortunately, diffused before striking the cyan filter. As a result, the yellow (inverted blue) separation typically has a greater resolution compared to the cyan (inverted red) separation. The magenta (inverted green) separation is not created with a bipack arrangement and typically has a resolution that is similar to that of the yellow (inverted blue) separation. This difference in resolution may result in red fringing or blurring around edges in the picture or image.

SUMMARY

An implementation described below addresses the lower resolution of the red separation by increasing the resolution of selected portions of the red separation. The portions are selected using information from a higher resolution separation (blue or green). For example, such information may include determining that a particular edge in the higher resolution separation corresponds to an edge in the red separation, in which case that particular edge in the red separation may become a selected portion. After selecting the portions, the resolution of the selected portions is increased by using information produced by the application of a wavelet transformation to the higher resolution separation to modify corresponding information produced by the application of a wavelet transformation to the red separation. For example, various coefficients produced by the application of the wavelet transformation to the higher resolution separation (or a function of these coefficients) may be copied to a set of coefficients produced by the application of the wavelet transformation to the red separation, where such coefficients impact the selected portions.

This implementation provides an automatic and efficient differential resolution reduction process for color film separations. Further, the process requires minimal human intervention and determines where differential resolution should be reduced or corrected within an image.

Many implementations may be characterized as including a "where" operation and a "how" operation. The "where" operation determines where to modify an image, and may do so, for example, by determining the portion(s) at which one or more properties of an image are to be modified. The "how" operation determines how to modify the portion(s) of the image identified in the "where" operation. Either or both of the "where" and "how" operations may use, for example, frequency-based information, time-based information, or both, and the information may be, for example, intra-frame or inter-frame.

According to one aspect, reducing differential resolution includes selecting a first image containing first information about a scene, and selecting a second image containing second information about the scene. A portion of the first image and a portion of the second image have differential resolution. A location at which to modify a property of the first image is determined, with the location being in a portion of the first image. The differential resolution is reduced by modifying the property at the location in the first image using information from the second image.

The first image and the second image may be digital images. The location may include a pixel, and the property may include an intensity value of the pixel or a function of the intensity value. The information used in modifying the property at the location may include resolution information from the second image.

Modifying the property at the location in the first image may include modifying information produced by application of a first transformation to the portion of the first image using information produced by application of a second transformation to the portion of the second image. Each of the transformations may include a wavelet transformation.

Modifying information produced by application of the first transformation may include copying or scaling a coefficient from a specific location in a result produced by application of the second wavelet transformation to the specific location in a result produced by application of the first wavelet transformation. For example, modifying information produced by application of the first transformation may include copying or scaling a coefficient from each non-baseband subband produced by application of the second wavelet transformation to a corresponding location in a result produced by application of the first wavelet transformation.

Alternatively, modifying information produced by application of a first transformation may include modifying a coefficient from each non-baseband subband produced by application of the first wavelet transformation based on a coefficient from a corresponding location in a result produced by application of the second wavelet transformation. Modifying a coefficient from each non-baseband subband may include copying a coefficient to each non-baseband subband produced by application of the first wavelet transformation from a corresponding location in a result produced by application of the second wavelet transformation. The one or more copied coefficients may be scaled before being copied.

The specific location may be associated with the location at which the property is to be modified. Each copied, scaled, or modified coefficient may be associated with the location to modify.

The first image and the second image may be color separations of a film frame or may be extracted from a composite color image. The color composite image may be generated from color separations of a film frame. The first image may be a red separation and the differential resolution may result in red fringing.

A non-modify location may be determined at which the property is not to be modified. Modifying the property at the location in the first image using information from the second image may include modifying one or more coefficients produced by application of a wavelet transformation to the first image based on one or more coefficients produced by application of a wavelet transformation to the second image. The modifying may produce a modified result. An inverse wavelet transformation may be applied to the modified result to produce a resulting image, and a determination may be made as to whether the property at the non-modify location is modified in the resulting image. If so, the property at the non-modify location may be restored to its original value.

A feathering technique may be applied to a region of the first image including the location at which the property is to be modified. The feathering technique may be applied after the property at the location is modified. Applying the feathering technique may include linearly interpolating between intensity values within the region.

Modifying the property at the location may include performing a transformation in only a first direction to produce a modified first image. A transformation may be performed on the modified first image in only a second direction that is orthogonal to the first direction to produce a modified version of the modified first image. Determining the location in the portion of the first image may be based on information obtained at least in part from the portion of the second image. The information may be for the first direction only.

The first image may include an image that has been modified with information obtained from the second image. Selecting a second image may include selecting a second image from multiple images based on one or more criteria that may include intensity value information and resolution information.

The location may be determined automatically or interactively, and the determination may be based on information in the second image. The property at the location may be modified automatically.

Determining the location may include selecting one or more edges to modify. For example, for one of the one or more edges, a single edge pixel of an edge that includes multiple edge pixels may be selected.

Selecting one or more edges to modify may include comparing one or more features of an edge in the first image with one or more features of an edge in the second image. The edge may be selected as an edge to modify based on a result of the comparison. The one or more features may include a feature selected from a group consisting of a location of the edge, a direction of the edge, an extent of the edge, an intensity-change direction, and an intensity range traversed.

An edge extent to modify may be determined for each selected edge. A selected edge may be unselected based on size of the selected edge. Multiple edges may be selected for modification. Two of the selected edges may be connected based on properties of the two selected edges. An edge extent may be determined for the connected selected edges.

Two selected edges may be connected based on spatial proximity between the two selected edges, or based on one or more of intensity differences between particular pixels in each of the two selected edges and intensity differences between particular pixels spatially located between the two selected edges. An edge extent for the connected selected edges may be determined based on edge extents that would have been determined for each of the selected edges before the edges were connected.

According to another aspect, modifying an edge includes accessing first and second images, with the second image including information that is complementary to information in the first image. An edge is selected in the first image and modified based on information in the second image.

Modifying the selected edge may include using resolution information about an edge in the second image that may correspond to the edge in the first image. Modifying the selected edge may include modifying information produced by application of a first wavelet transformation to a portion of the edge in the first image based on information produced by application of a second wavelet transformation to a portion of the corresponding edge in the second image.

Modifying information produced by application of the first wavelet transformation may include copying a coefficient or a scaled coefficient from a result produced by application of the second wavelet transformation. The coefficient or the scaled coefficient may be copied to a result produced by application of the first wavelet transformation.

According to another aspect, reducing differential resolution includes accessing a first image containing first information about a scene, and accessing a second image containing second information about the scene, where a portion of the first image and a portion of the second image have differential resolution. A location is determined in the first image at which to modify a property in the first image to reduce the differential resolution based on a time-domain comparison of the portion of the first image and the portion of the second image. The differential resolution is reduced by modifying the property at the location by modifying information produced by application of a wavelet transformation to the portion of the first image based on information produced by application of a wavelet transformation to the portion of the second image.

An apparatus may include a computer readable medium having instructions stored thereon that when executed by a machine result in various of the above operations being performed. The apparatus may include a processing device coupled to the computer readable medium for executing the stored instructions.

One or more implementations are set forth in the accompanying drawings and the description below. Other implementations will be apparent from the description, the drawings, and the claims.

DESCRIPTION OF DRAWINGS

FIG. 5 is an edge map for a simple low resolution digital image.

FIG. 6 is an edge map for a simple reference digital image.

FIG. 7 is an edge extent for the edges in FIG. 5.

FIG. 8 is an edge extent for the edges in FIG. 6.

FIG. 9 shows the edges from the edge map in FIG. 5 that have a matching edge in the edge map in FIG. 6.

FIG. 10 shows the edge map in FIG. 9 after applying a continuity operation.

FIG. 12 is an edge extent for the edge map in FIG. 10.

FIG. 13 is a classification map showing "modify" pixels.

FIG. 16 is a map of a portion of a column of an image, providing certain information used in a feathering operation.

DETAILED DESCRIPTION

Figure 1A:
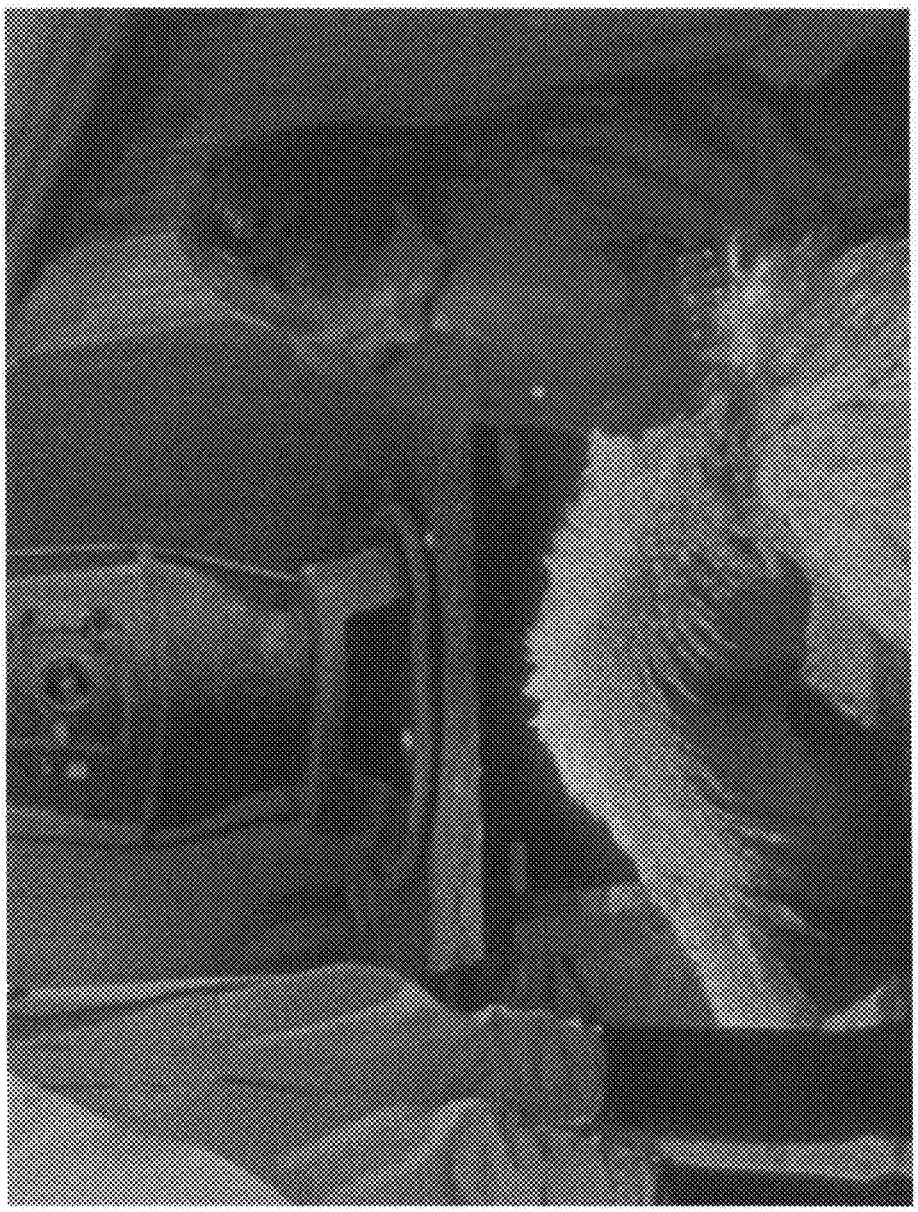
FIG. 1A is an image in which red fringing is manifested from differential resolution of separations.
Figure 1B:
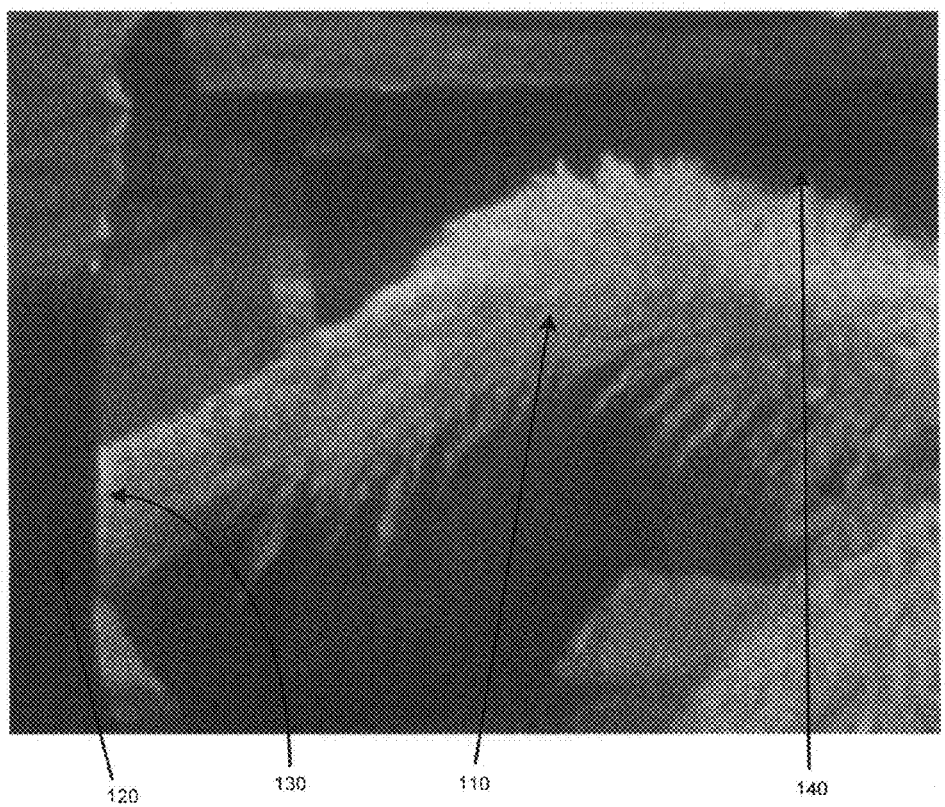
FIG. 1B is a color image of a portion of FIG. 1A, illustrating the red fringing.

FIG. 1A shows a portion of a scene in which red fringing occurs around various objects. FIG. 1B is a color image of a portion of FIG. 1A illustrating red fringing around edges along a pair of white pants 110 and along a boot 120. For example, a region 130 shows red fringing to the right of boot 120. Also, a region 140 shows red fringing above white pants 110. The red fringing is a result of differential resolution between the separations of the color image. As described above, the red fringing may have been introduced by the filming process.

Figure 2:
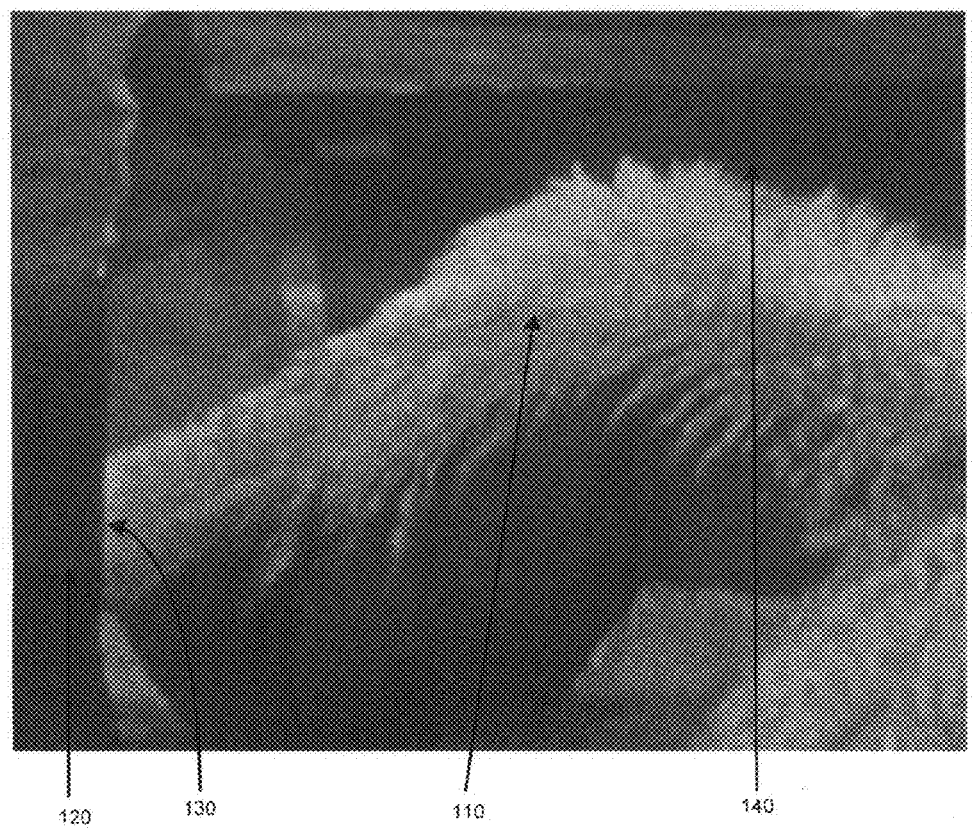
FIG. 2 is the color image of FIG. 1B after being processed to reduce the differential resolution.

FIG. 2 shows the same color image from FIG. 1B after the color separations are processed using a technique described below to reduce the red fringing. As FIG. 2 illustrates, the red fringing around white pants 110, particularly in region 140 above the contoured edge of white pants 110, has been significantly reduced or eliminated. The red fringing in region 130 along boot 120 also has been significantly reduced or eliminated. Further, processing the image of FIG. 1B to reduce the red fringing has not visibly degraded the resolution or quality of the image in other aspects.

Figure 3:
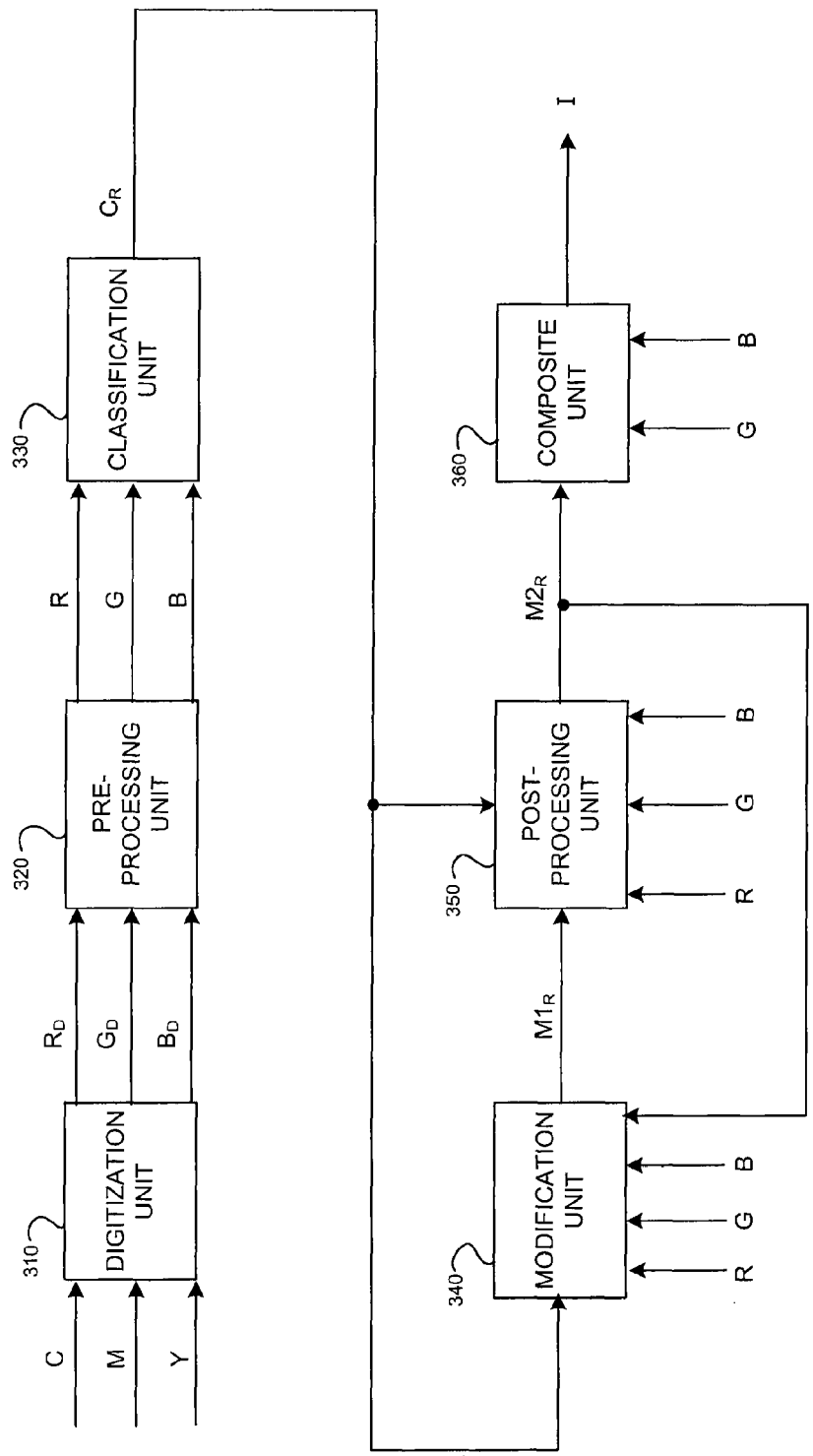
FIG. 3 is a block diagram of a system for reducing differential resolution.

FIG. 3 is a block diagram of a system 300 for reducing differential resolution. As an overview, system 300 performs the two general operations: (1) identifying locations for which the resolution should be modified and (2) modifying the resolution for those locations. The description below generally refers to individual images (frames), with the understanding that the process is repeated for each image in a reel.

Digitization Unit

System 300 includes a digitization unit 310 that receives the three separation images C (cyan), M (magenta), and Y (yellow), and provides three digital color component images ("digital images") $R_D$ (red), $G_D$ (green), and $B_D$ (blue). The subscript D indicates that the image is digitized. Digitization unit 310 thus performs the steps of inverting the photographic negatives (C, M, Y) into photographic positives and digitizing the resulting positives into three digital images ($R_D$, $G_D$, $B_D$).

Each digital image includes an array of pixels having a width and a height. Within the array, each pixel location can be characterized by:

(x,y), where 0<=x<=width, and 0<=y<=height.

Each pixel location has an associated gray-level value that can be characterized by:

I(x,y), where 0<=I(x,y)<=I_max.

I(x, y) represents the intensity of a particular color (for example, red, green, or blue) at pixel location (x, y). I_max represents the maximum possible intensity value for the pixel. For example, in the case of 16-bit data, I_max=65,535.

Pre-Processing Unit

System 300 also includes a pre-processing unit 320 that receives digital images $R_D$, $G_D$, and $B_D$ from digitization unit 310 and produces modified digital images R, G, and B. Pre-processing unit 320 is an optional unit in system 300 and performs pre-processing operations on one or more of the three digital images $R_D$, $G_D$, and $B_D$. For example, one or more of the images $R_D$, $G_D$, and $B_D$ may be smoothed, may be altered with a registration algorithm so as to be better aligned with the other digital images that compose the frame, or may be processed with a grain reduction algorithm. In one implementation, pre-processing unit 320 operates on all three digital images $R_D$, $G_D$, and $B_D$, and performs the following operations: (i) grain reduction using smoothing, (ii) registration, and (iii) an additional smoothing operation. If pre-processing unit 320 is not included in system 300, then images R, G, and B will be the same as images $R_D$, $G_D$, and $B_D$, respectively.

Classification Unit

System 300 also includes a classification unit 330 that receives digital images R, G, and B from pre-processing unit 320 and provides a classification map for one of the images.

For example, a classification map $C_R$ identifies one or more locations (pixels) within the red digital image for which the resolution is to be increased. $C_R$ can be represented by the same array as the red digital image, except that each pixel contains either "modify" (M), "potentially modify" (PM), or "non-modify" (NM) labels rather than an intensity value. "Modify" indicates that the pixel intensity value of the corresponding pixel location in the red digital image is to be modified; "potentially modify" indicates that the pixel intensity value might be modified, depending on, for example, further testing; and "non-modify" indicates that the pixel intensity value is not to be modified.

In one implementation, described in detail below, a label of PM is only an interim label and the output of classification unit 330 is a classification map $C_R$ in which the pixels are labeled either M or NM, but not PM. The use of the interim PM label allows the implementation to capture and to use the fact that a particular pixel may have passed at least some of the tests that indicate that a pixel should be modified.

Determining whether to modify a given pixel location can be based on a variety of factors. Because red fringing is a phenomenon associated with edges, classification unit 330 uses edge information to determine which pixels to modify. Edge information may be obtained for edges in one dimension or multiple dimensions. For example, classification unit 330 may use edge information pertaining to two-dimensional edges. Conversely, classification unit 330 may perform two iterations, with the first iteration using edge information pertaining only to, for example, horizontal edges and the second iteration using edge information pertaining only to, for example, vertical edges.

Determining whether to modify a given pixel in the red digital image is based on information in one or more of the other digital images G and B, as well as on information in the red digital image R. Classification unit 330 determines which of the other digital images to use to provide information for use in modifying the red digital image, and the digital image used to provide information is referred to as the reference digital image. Various criteria may be used to select the reference digital image, including, for example, intensity value information and resolution information, as the following examples indicate.

In one implementation, if the green and blue digital images both have an edge that matches an edge in the red digital image, the digital image (green or blue) that has the minimum average intensity at the ending (across one or more pixels) of the edge transition is selected as the reference digital image for that edge. In another implementation, if the green and blue digital images both have an edge that matches an edge in the red digital image, the digital image (green or blue) that has the highest resolution is selected as the reference digital image. Resolution, or sharpness, can be defined in a variety of ways. For example, resolution for a set of pixels may be defined as a ratio of the range of intensity values present in the pixels (that is, the maximum intensity value minus the minimum intensity value) over the number of pixels in the set. In a further implementation, the selection criteria for selecting the reference digital image to be used for one particular edge may be different from the selection criteria used for another edge. When more than one reference digital image can be used, the classification map $C_R$ produced by classification unit 330 may provide not only M or NM information for each edge pixel, but also may provide information about which reference digital image is used for each edge pixel.

Figure 4:
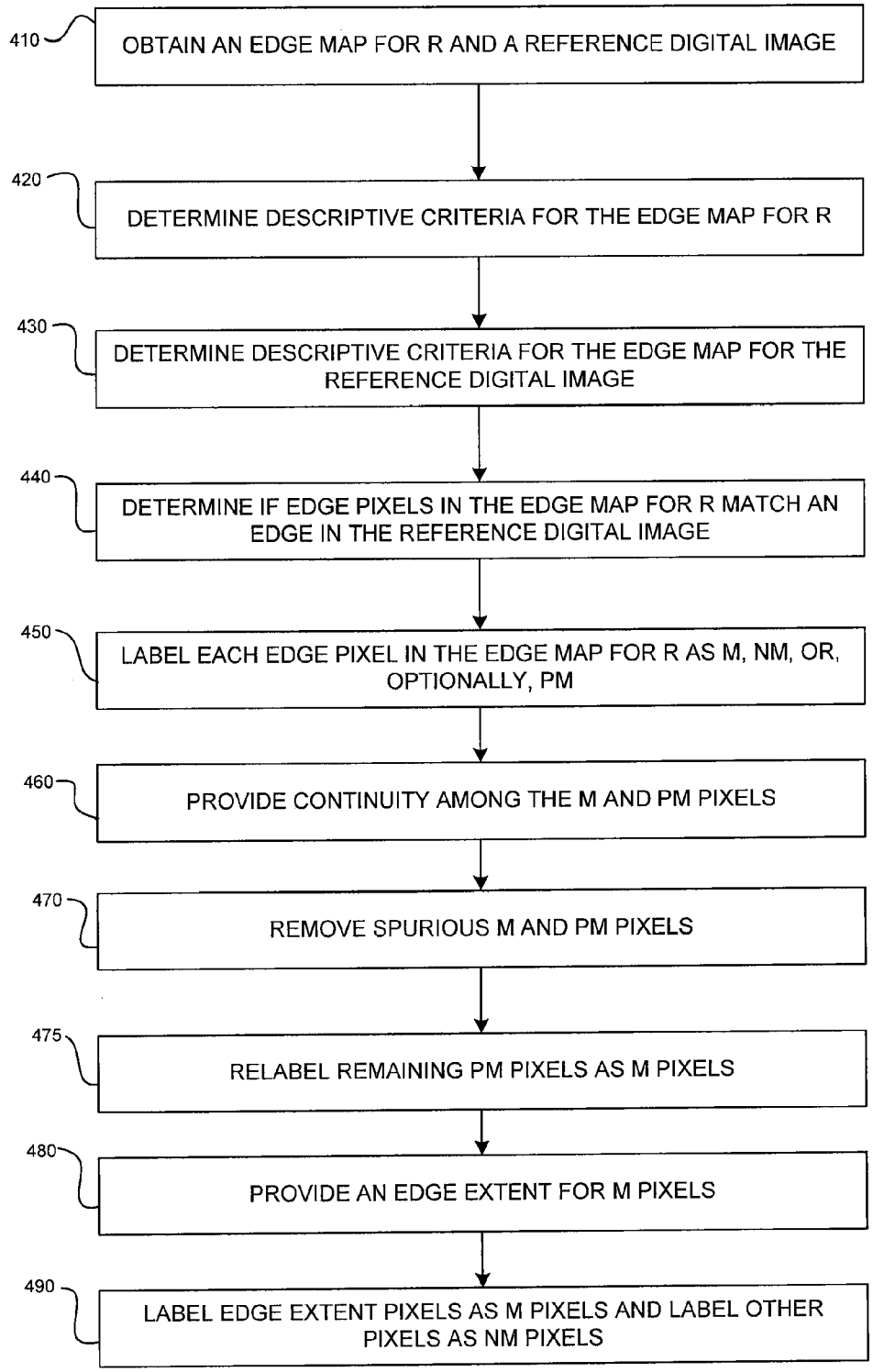
FIG. 4 is a flow chart of a process to determine whether a pixel is to be modified.
Figures 5, 6:
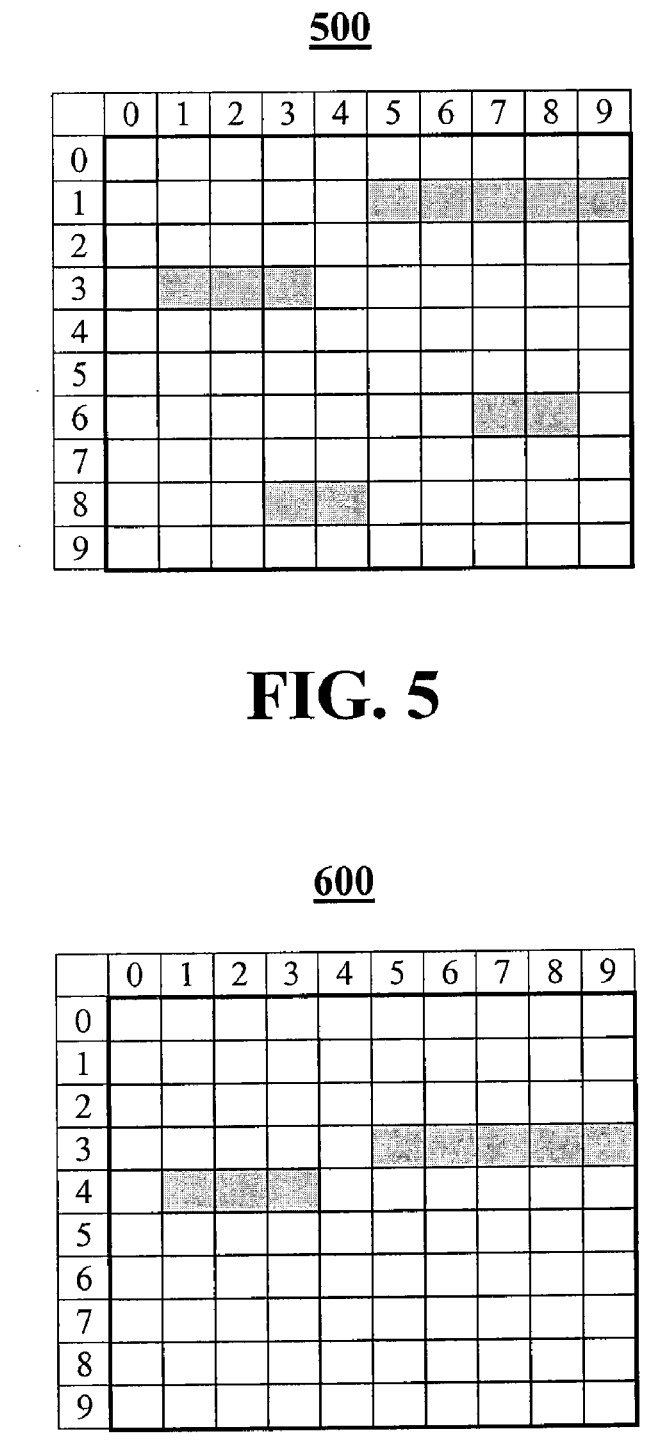

FIG. 4 is a flow chart of a process 400 used by one implementation of classification unit 330 to determine whether a pixel in the red digital image is to be modified. Process 400 includes obtaining a set of edges (an edge map) for R and one or more of G and B (410). The edge maps may be obtained by, for example, using an edge detection filter, such as, for example, a Canny filter. The pixels making up the edge are referred to as edge pixels or edge transition pixels. The edge information may be combined or may be separated. For example, the edge information may be separated into sets of information that capture edges in orthogonal directions. One implementation obtains separate horizontal and vertical edge information. FIGS. 5 and 6 illustrate edge maps for a simple red digital image and a simple reference digital image, respectively.

FIG. 5 shows a sample edge map 500 for a red digital image that has, for simplicity, only one-dimensional horizontal edges. Edge map 500 shows four edges. The four edges are: (i) a one-dimensional horizontal edge covering pixels from (1,3) to (3, 3), (ii) a one-dimensional horizontal edge covering pixels from (5,1) to (9,1), (iii) a one-dimensional horizontal edge covering pixels from (3,8) to (4,8), and (iv) a one-dimensional horizontal edge covering pixels from (7,6) to (8,6).

FIG. 6 shows a sample edge map 600 for a simple reference digital image. Edge map 600 shows two edges. The two edges are: (i) a one-dimensional horizontal edge covering pixels from (1,4) to (3,4), and (ii) a one-dimensional horizontal edge covering pixels from (5,3) to (9,3).

Process 400 includes determining descriptive criteria for the edge map for the red digital image (420) and for the edge map for the reference digital image (430). The descriptive criteria may be determined for each edge pixel in the edge or may be determined jointly for multiple edge pixels within an edge (that is, up to and including all edge pixels within the edge). Hereafter the term edge may be used to describe either one edge pixel within an edge or multiple edge pixels within an edge (that is, up to and including all edge pixels within the edge). Descriptive criteria include, for example, (i) whether the edge is a horizontal and/or a vertical edge, (ii) whether the edge transitions, in a given direction, from high to low intensity or low to high intensity—an intensity-change direction, (iii) the location of the edge, (iv) the extent of the edge, (v) the range of intensities that is traversed in the edge, and (vi) various other functions of the pixel intensities and pixel locations of the edges of the red digital image and the reference digital image.

The "edge extent" refers to the set of pixels that define the edge transition. The edge extent can be determined from a given edge using a variety of factors, such as, for example, intensity values. The edge extent of a particular edge also may be influenced by whether there are other edges in the neighborhood of the particular edge. The edge extent may be determined in one or more directions; for example, the edge extent may be determined for either one or two dimensions depending on whether the edge map contains one or two dimensional edges. An edge extent also may be defined for a single edge pixel.

Figures 7, 8:
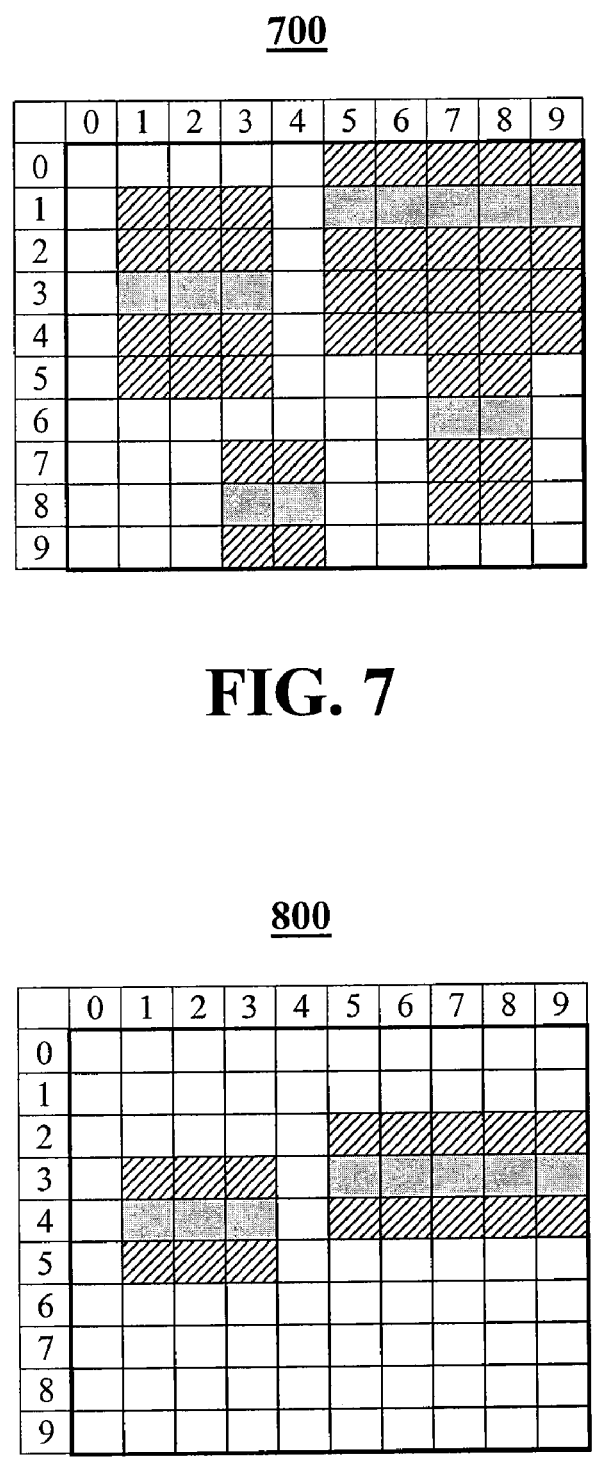

FIG. 7 shows a sample edge extent 700 for the four edges in edge map 500. The edge extent is shown in cross-hatching to differentiate from the actual edge itself, although the edge is also considered part of the edge extent. As shown, the edge extent for the edge beginning at (1,3) extends upward by 2 pixels and downward by 2 pixels. The edge extent for the edge beginning at (5,1) extends upward by 1 pixel and downward by 3 pixels. The edge extent for the edge beginning at (3,8) extends upward by 1 pixel and downward by 1 pixel. The edge extent for the edge beginning at (7,6) extends upward by 1 pixel and downward by 2 pixels.

FIG. 8 shows a sample edge extent 800 for the two edges in edge map 600. As in FIG. 7, the edge extent is shown in cross-hatching to differentiate from the actual edge itself, although the edge is also considered part of the edge extent. As shown, the edge extents for the two edges extend 1 pixel in both the upward and downward directions.

Process 400 includes determining, for each edge in the edge map for the red digital image, if the edge matches an edge in the edge map for the reference digital image (440). The term "match" is used not only to indicate that the edges correspond to one another with respect to spatial location, but also to indicate that differential resolution exists between the edge of the red digital image and the edge of the reference digital image and that the edge in the red digital image is considered a candidate for modification. Other implementations may determine a "match" using other criteria, such as, for example, by considering only whether edges correspond spatially. The factors used to evaluate edges may provide information relating, for example, to a spatial relationship, to the existence of differential resolution, or to both. The determination of whether edges are matched may be made in a variety of ways, including, for example, using information about each edge individually as well as information comparing edges. In one implementation, descriptive criteria for the edges is compared by considering, for example, whether the edges have a similar direction, whether the edge extent intensity values transition in the same direction (for example, low to high, or high to low), whether the edge extent intensity values have similar intensity ranges, and whether the edges satisfy a particular distance metric (for example, whether the edges, or some designated part of the edges such as their beginnings, ends, or middles, are within a particular distance of each other).

Implementations may use one or more of a variety of other factors to determine whether or not edges match. Such factors include, for example, (i) the distance between the location of the maximum intensity value for the edge under consideration in the red digital image and the location of the maximum or minimum intensity value for the edge under consideration in the reference digital image, (ii) the distance between the location of the minimum intensity value for the edge under consideration in the red digital image and the location of the minimum or maximum intensity value for the edge under consideration in the reference digital image, (iii) when there is another edge (termed an adjacent edge) in the red digital image that is within a particular proximity of the current edge under consideration in the red digital image, the difference between the average intensity of the red image and the reference digital image measured over the edge extent (or a subset of the edge extent) of this adjacent red edge, (iv) the difference between the average intensity of the red edge and the reference edge, as measured over the edge extent (or a subset of the edge extent) of either the red edge or the reference edge, (v) the ratio between the intensity range traversed by the reference edge and by the red edge, and (vi) the difference between the intensity values (or between averages over a range of pixels) of the red and reference edges at various locations. Such factors also may include frequency information or resolution information in the wavelet domain in addition to spatial domain information. Implementations may determine which factor(s) to use based on the particular characteristics of the red and reference edges. For example, different factors may be used depending upon whether the red and/or reference edges have a maximum intensity value that exceeds a particular threshold value. As another example, different factors may be used depending upon whether one or more edge pixels adjacent to the edge pixel(s) under consideration in the non-reference digital image (red, for example) have matching edge pixel(s) within the reference digital image.

In making the determination of whether two edges match, one or more factors may be analyzed or combined in many ways. For example, the determination may be based on (i) a binary result, such as, for example, whether a particular threshold was met, (ii) a multi-factor analysis, such as, for example, whether a majority of the factors being considered yielded favorable results, where the factors may be weighted in importance, and (iii) a probabilistic determination, such as, for example, a probabilistic assessment of the likelihood that two edges match, where the assessment is based on various factors. In one implementation involving a probabilistic determination, labeling a pixel as a PM pixel may indicate that there is a high probability that the pixel is a matching pixel, but that the probability is lower than that for an M pixel. The preceding examples are not necessarily exclusive of each other.

As with determining a match, the determination that a pixel should be labeled as a PM pixel may depend on numerous factors or a single factor. Whether a PM pixel eventually is determined to be an M pixel or an NM pixel may depend upon subsequent operations. For example, as described below, the continuity, pruning, and relabeling operations may be used to determine how PM pixels are finally to be labeled.

FIGS. 5 and 6 can be used to provide an illustration of operation 440. As discussed above, the twelve edge pixels define four edges in edge map 500. In this example, each edge pixel (and its associated edge extent—in this example, the edge extents run vertically) in edge map 500 is considered in turn to determine if the edge pixel (and its associated extent) matches an edge pixel (and its associated extent) in edge map 600. In other implementations, multiple edge pixels of an edge (up to and including the entire edge) can be jointly considered to determine if the edge matches an edge in edge map 600.

In FIG. 5, edge pixels occur at locations (1,3) to (3,3), locations (5,1) to (9,1), locations (3,8) to (4,8), and locations (7,6) to (8,6). Assuming that a distance of two pixels is acceptable, and that any other matching criteria are satisfied for the edge pixels at locations (1,3), (2,3), (3,3), (5, 1), (6,1), (7,1) and (8,1) when compared to edge pixels (1,4) (2,4), (3,4), (5,3), (6,3), (7,3), and (8,3), respectively, in edge map 600, then these edge pixels are labeled as M pixels. The edge pixel at location (9,1) in edge map 500 is assumed, for purposes of illustration, to be a potential match to edge pixel (9,3) in edge map 600. The edge pixels at locations (3,8) and (4,8) are assumed not to match any edge pixels in edge map 600. The edge pixels at locations (7,6) and (8,6) are assumed, for purposes of illustration, to be a potential match for edge pixels in edge map 600.

Process 400 includes labeling each edge pixel of the edge map for the red digital image (450). The pixels may be labeled, for example, as either an M pixel if there is a matching reference edge, a PM pixel if there is a potentially matching reference edge, or as an NM pixel otherwise.

FIG. 9 shows an edge map 900 obtained after applying operation 450 to edge map 500. In FIG. 9, the eight pixels at locations (1,3), (2,3), (3,3), (5,1), (6,1), (7,1), and (8,1) are labeled as M pixels because these edge pixels (and their associated edge extents) have matches in edge map 600 for the reference digital image. The pixel at location (9,1) is labeled as a PM pixel. The two pixels at locations (3,8) and (4,8) are labeled as NM pixels, and the two pixels at locations (7,6) and (8,6) are labeled as PM pixels.

Process 400 includes providing continuity among the M and PM pixels in the edge map (460). For example, a neighborhood of a particular extent in the horizontal and/or vertical direction may be defined around each M and PM pixel within the edge map for the lower resolution image. If a pixel within this neighborhood is identified as an M or PM pixel, particular pixels that lie along the direction (for example, horizontal, vertical, or diagonal) between that pixel and the M or PM pixel under consideration may be labeled as M or PM pixels as well in order to ensure continuity among the M or PM pixels. In one such implementation, all PM pixels are treated as M pixels for operation 460 such that all pixels that are relabeled in operation 460 are relabeled as M pixels, and not as PM pixels.

FIG. 10 shows an edge map 1000 obtained after applying operation 460 to edge map 900 using a neighborhood having an extent of five in both the horizontal and vertical directions. With an extent of five in both the horizontal and vertical directions, the neighborhood around pixel (3,3) is shown by a bold outline. Continuity operation 460 changes pixel (4,2) to an M pixel, as shown, because pixel (4,2) lies between M pixel (5,1) and the M pixel under consideration—pixel (3,3). Edge map 1000 also shows with a bold outline a neighborhood having an extent of five in both the horizontal and vertical directions around pixel (7,6). However, continuity operation 460 does not result in changing any pixels in the neighborhood around pixel (7,6). Pixels (3,8) and (4,8) are not explicitly labeled NM pixels because all unlabeled pixels are understood to be NM pixels.

Continuity between edge pixels may be provided in various other ways. One example includes connecting two edge pixels if the intensity difference between the two edge pixels, as well as the intensity difference between particular pixels that are spatially located between the two edge pixels, both fall below a particular threshold.

Process 400 includes removing spurious M or PM pixels in the edge map (470). In one implementation, the set of M or PM pixels are pruned to a smaller set so as to reduce the inclusion of pixels that may have been misclassified as M or PM pixels. Such misclassifications may occur, for example, due to noise. A variety of criteria may be used to perform this pruning operation.

Figure 11:
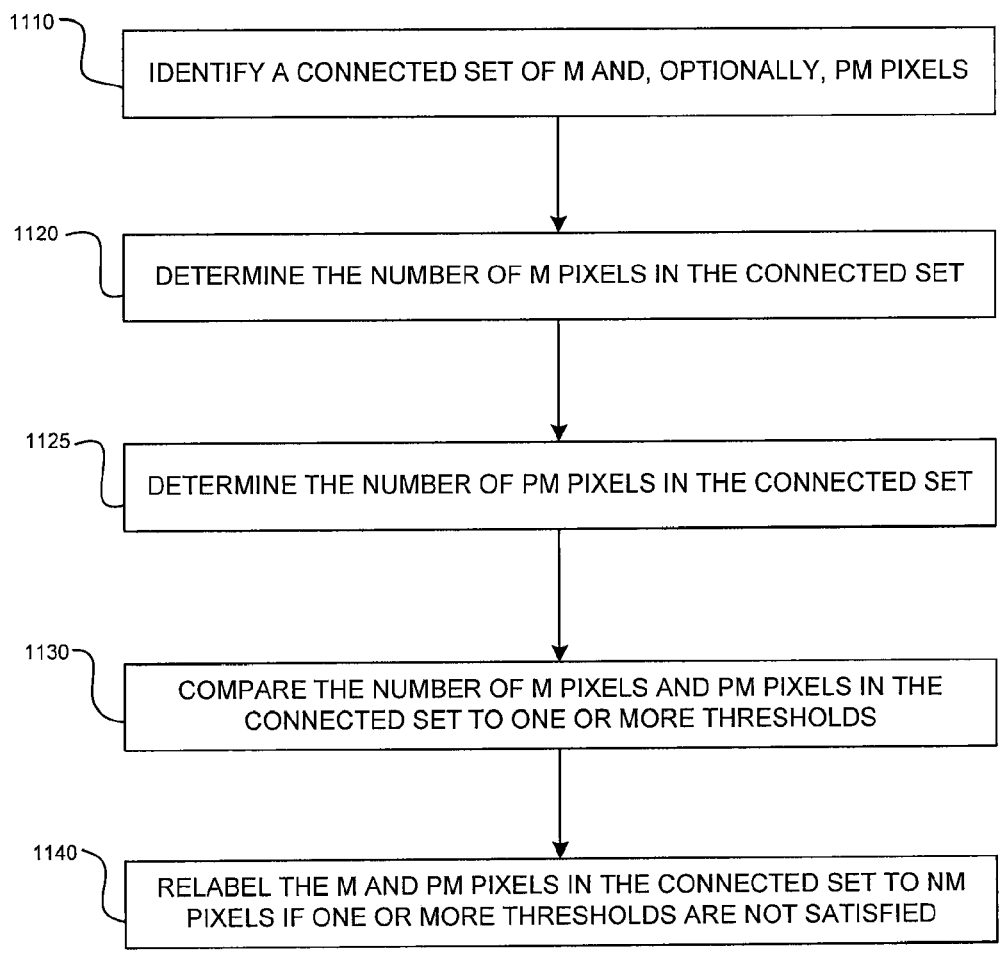
FIG. 11 is a flow chart of a process for pruning "modify" pixels.

FIG. 11 is a flow chart of a process 1100 used by classification unit 330 for pruning M or PM pixels. Process 1100 includes identifying a connected set of M, and optionally PM, pixels (1110). A connected set is defined as a set of all possible M or PM pixels in which each M or PM pixel is adjacent to at least one other M or PM pixel in the set. M or PM pixels are adjacent if they are next to each other in either the horizontal, vertical, or diagonal direction. In edge map 1000, the eight M pixels and one adjacent PM pixel are in a connected set, and the two remaining PM pixels are in a separate connected set.

Process 1100 includes determining, for a given connected set, the number of M pixels (1120) and the number of PM pixels (1125). Process 1100 includes comparing the number of M and/or PM pixels in the connected set to one or more thresholds (1130), and relabeling the M or PM pixels in the connected set to NM pixels if one or more of the thresholds is not satisfied (1140). In one implementation, the sum of the number of M pixels and the number of PM pixels is compared to a size threshold. If the sum is less than the size threshold, then the M and PM pixels are relabeled as NM pixels. Conversely, if the sum is greater than or equal to the size threshold, then the PM pixels in the connected set are relabeled as M pixels. Operations 1130 and 1140 also, or alternatively, may include comparing the ratio of M to PM pixels in the connected set to a ratio threshold. If the ratio of M to PM pixels is less than the ratio threshold, then the M or PM pixels in the connected set are relabeled as NM pixels. Conversely, if the ratio is greater than or equal to the ratio threshold, then the PM pixels in the connected set are relabeled as M pixels.

Continuing with the example above from FIG. 10, and assuming that a size threshold of three is to be applied, then the connected set of M pixels and one PM pixel are not relabeled as NM pixels, and the connected set of PM pixels are relabeled as NM pixels. If a ratio threshold were applied, and assuming that the ratio threshold was less than or equal to 8 M pixels to 1 PM pixel, then the connected set of M pixels would remain as M pixels, the adjacent PM pixel at location (9,1) would be relabeled as an M pixel, and the connected set of PM pixels would be relabeled as NM pixels.

Referring again to FIG. 4, process 400 also includes providing an edge extent for all M pixels in the edge map (480). For M pixels that are edge pixels from the edge map for the red digital image, the edge extent may be taken to be, for example, the original edge extent from the red digital image. The original edge extent may be determined, for example, in one dimension (for example, horizontal or vertical) or two dimensions. For M pixels that are not edge pixels, such as pixels labeled as M pixels in operation 460, an edge extent may be taken to be, for example, a function of the edge extent of one or more adjacent M pixels.

In one implementation, similarity of edge extents for a connected set of M pixels is provided by designating similar edge extents for all M pixels within the connected set. The edge extents can be determined, for example, based on a function of the original edge extents of the M pixels in the connected set that have an original edge extent. For example, the edge extent for all M pixels in the connected set can be the median, average, minimum, or maximum of the original edge extents. These median, average, or other types of statistical values determined by the collection of M pixels in the connected set also can be used as a starting point in determining the edge extent for each M pixel in the connected set.

FIG. 12 shows an edge extent 1200 obtained by applying operation 480 to the M pixels in edge map 1000. The original edge extent of the M pixels that are also edge pixels is shown in FIG. 7. The edge extent in FIG. 7 has a median upward extent of one pixel and a median downward extent of three pixels. These two medians of the original edge extent are used for the edge extent provided in FIG. 12, and the M pixel that was labeled in operation 460 is also given the same upward and downward extents.

Process 400 includes labeling all edge extent pixels in the edge map as M pixels and labeling all other pixels as NM pixels (490). FIG. 13 shows a classification map 1300 produced by labeling the edge extent pixels of FIG. 12 as M pixels, with the exception that unlabeled pixel locations are understood to be NM pixels.

Modification Unit

Referring again to FIG. 3, system 300 also includes a modification unit 340 that (i) receives classification map $C_R$ and the three digital images R, G, and B, (ii) increases the resolution of the locations identified by the classification map, and (iii) provides a modified digital color component image for the red digital image (labeled $M1_R$). Modification unit 340 modifies the resolution content of the red digital image using resolution information from the reference digital image. Because the red digital image and the reference digital image have matching edges, the resolution information from the reference digital image (which is typically a higher resolution digital image compared to the red digital image) can be used to guide the modification of the red digital image. Modification unit 340 produces resolution information through the application of a wavelet transformation to the reference digital image, and uses the resolution information to modify information produced by the application of a wavelet transformation to the red digital image. A wavelet transformation is useful because such a transformation produces multiple representations (subbands) of the entire image at different resolutions, and because the resolution information at particular spatial locations is correlated with particular wavelet coefficients at corresponding locations within each subband.

Figure 14:
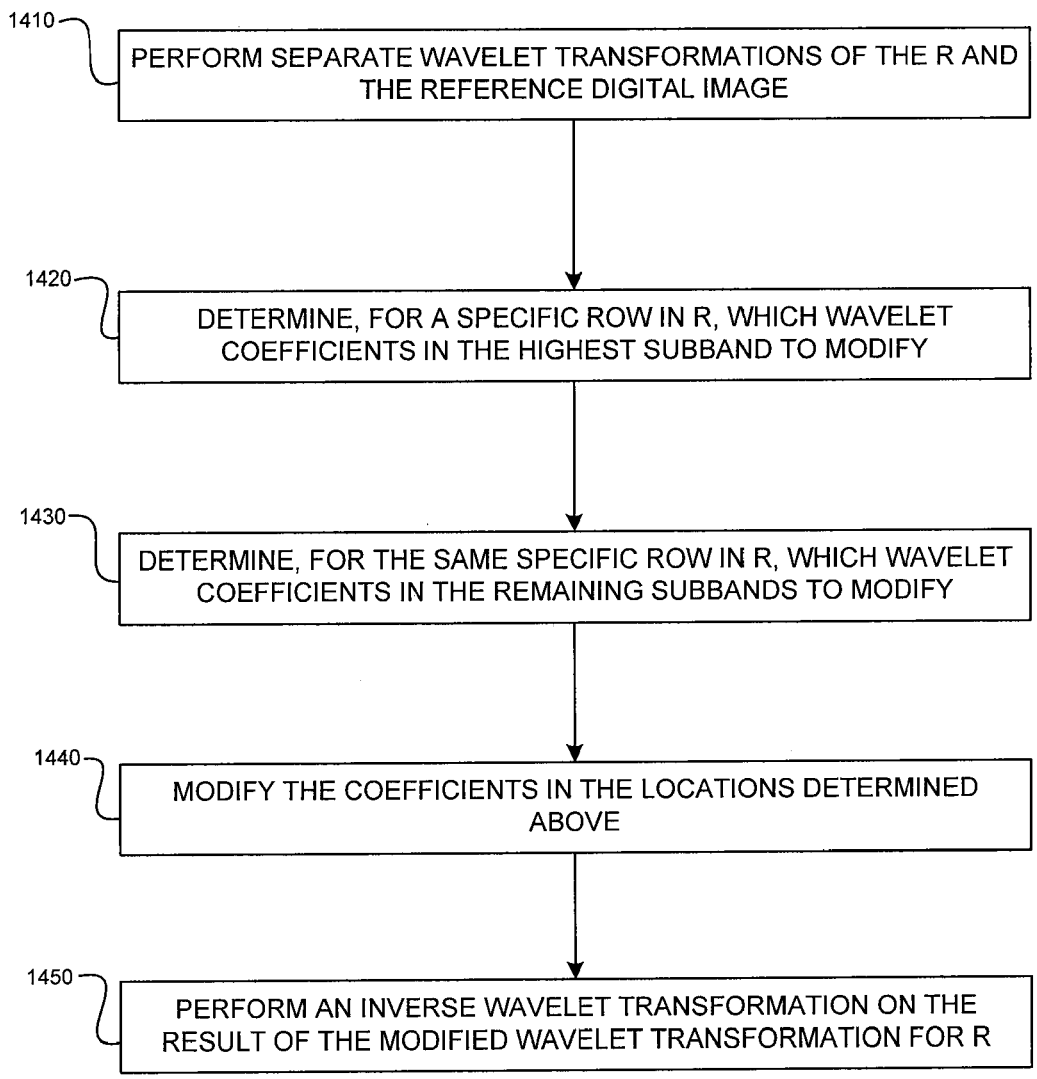
FIG. 14 is a flow chart of a process for modifying selected portions of a low resolution digital image.

FIG. 14 is a flow chart of a process 1400 that modification unit 340 uses to modify the red digital image. Process 1400 includes performing separate wavelet transformations on the red digital image and on the reference digital image (1410). The transformation may be performed, for example, on either one dimension at a time or two dimensions at a time, and either approach may produce better results in particular implementations. In one implementation that uses two passes, the transformations are one-dimensional in each pass and capture information corresponding to edges having orthogonal directions. The transformation is performed row-wise in the first pass to capture horizontal resolution information. A subsequent pass performs the transformations on columns to capture vertical resolution information.

Figures 15, 18:
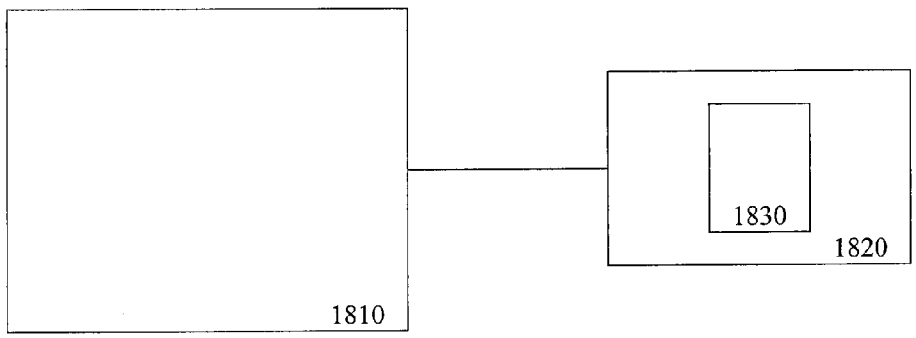
FIG. 15 is a table showing the correlation between wavelet coefficients and pixels in a row of a digital image.
FIG. 18 is a block diagram of a system for implementing disclosed features.

FIG. 15 is a table 1500 showing the results of a simplified example involving one row. Row "x" refers to the classification map and shows that row x has sixteen pixels, seven of which are M pixels (the intensity values of row x of the digital image are not shown). The seven M pixels are in positions 1-6 and 9, and the remaining pixels are NM pixels, although the NM pixels are not labeled. In general, a one-level, one-dimensional row-wise wavelet transformation of the digital image produces two subbands having a total of sixteen coefficients (not shown) that are correlated or associated with row x of the digital image. One subband represents low resolution information and the other subband represents high resolution information. A four-level, one-dimensional wavelet transformation of the digital image produces five subbands, where there is one coefficient for subband 0 (baseband), one coefficient for subband 1, two coefficients for subband 2, four coefficients for subband 3, and eight coefficients for subband 4. The positions in row x to which each of these sixteen coefficients are correlated are indicated by the numbers shown in table 1500.

In general, the wavelet transformation performed by modification unit 340 on the entire digital image produces, for each row of the digital image, "z" coefficients for the highest subband, where "z" is equal to half the number of pixels in a row, "z/2" coefficients for the second highest subband, "z/4" coefficients for the third highest subband, and so forth. The wavelet coefficients are said to be correlated or associated with a spatial region (a particular row or portion of a row in this case) of the digital image, although the resolution component identified by the wavelet coefficient will not generally be spatially limited to that region.

After computing the wavelet transformations, process 1400 determines which wavelet coefficient locations to modify in the digital image that is produced by the application of the wavelet transformation to the red digital image. This determination is performed for each row separately, and for each subband separately within each row.

Process 1400 includes determining, for a specific row in the red digital image, which wavelet coefficients in the highest subband to modify (1420). In one implementation, the coefficient located at position "j" in the highest subband of the wavelet transformation is modified if position 2*j or 2*j+1 in the specific row of the classification map $C_R$ is an M pixel, where "j" is greater than or equal to zero and is measured from the beginning location of the highest wavelet subband.

Operation 1420 can be illustrated by examining table 1500. The highest subband is subband 4, and position 0 will be modified because position 1 in row x of the classification map is an M pixel. Similarly, positions 1, 2, 3, and 4 will be modified, but positions 5, 6, and 7 will not be modified.

Process 1400 includes determining, for the same specific row in the red digital image, which wavelet coefficients in the remaining subbands to modify (1430). In one implementation, the remaining subbands are processed from highest to lowest. The coefficient located at position "j" in the next highest subband of the wavelet transformation is modified if position 2*j or 2*j+1 in the previous (higher) subband was modified.

Operation 1430 can be illustrated by examining table 1500. Continuing with the previous illustration, the next highest subband is subband 3, and position 0 (j=0) will be modified because position 0 (2*j) (or position 1 (2*j+1)) in subband 4 was modified. Similarly, positions 1 and 2 will be modified, but position 3 will not be modified.

Next, subband 2 is processed. Position 0 (j=0) will be modified because position 0 (2*j) (or position 1 (2*j+1)) in subband 3 was modified. Similarly, position 1 will also be modified.

Next, subband 1 is processed. Position 0 (j=0) will be modified because position 0 (j=0) (or position 1 (2*j+1)) in subband 2 was modified.

Finally, subband 0 is processed. Position 0 (j=0) will be modified because position 0 (j=0) in subband 1 was modified. In one implementation, no coefficients from subband 0 are ever modified.

Process 1400 includes modifying the coefficients in the locations determined above (1440). In one implementation, the coefficients are modified by being replaced.

In particular, the coefficients from the determined locations in the result produced by the application of the wavelet transformation to the reference digital image are copied (or scaled values are copied) over the coefficients in the determined locations in the result produced by the application of the wavelet transformation to the red digital image. Thus, the resolution information (or a function of the resolution information) for the reference digital image replaces the resolution information for the red digital image in the determined coefficient locations. Scaling a coefficient refers to multiplying the coefficient by a particular number.

Note that modification unit 340 only modifies the red (lower resolution) digital image and does not modify the reference (higher resolution) digital image.

Process 1400 includes performing an inverse wavelet transformation on the modified result of the application of the wavelet transformation to the red digital image (1450). The inverse transformation produces a modified red digital image that is labeled $M1_R$ in system 300.

Post-Processing Unit

Referring again to FIG. 3, system 300 also includes a post-processing unit 350 that receives $M1_R$, $C_R$, and the three digital images R, G, and B, and that produces a modified $M1_R$ referred to as $M2_R$. Post-processing unit 350 performs three operations, although other implementations may omit one or more of these three operations and add other operations.

First, post-processing unit 350 ensures that pixels in $M1_R$ that correspond to NM pixels in $C_R$ were not modified from their intensity values in the red digital image. If any such $M1_R$ pixels were modified, then the intensity values of those pixels are returned to the original value provided in the red digital image.

NM pixels may have been modified by changing wavelet coefficients in modification unit 340. As described earlier with respect to table 1500, coefficient 0 was modified in subbands 4, 3, 2, 1, and 0. As can be seen in table 1500, these five coefficients all affect NM pixel 0 in row x of the digital image. Thus, NM pixel 0 may be expected to be modified. Further, although the coefficients are associated or correlated with specific pixels in the digital image, the coefficients typically also produce effects in surrounding pixels (referred to as a spreading effect). Thus, for example, coefficient 3 in subband 4 may be expected to affect not only NM pixel 7 in row x of the digital image, but also NM pixel 8.

Second, post-processing unit 350 computes the resolution of $M1_R$, or a portion of $M1_R$, to ensure that the resolution did not decrease as a result of the modifications. If the resolution did decrease, a variety of actions may be initiated or performed. For example, if the resolution was decreased at particular pixel locations because of the modifications, then these pixel values may be returned to their original intensity values. Alternatively, one of the parameters for classification unit 330 and/or modification unit 340 may be changed, and the operations of that unit may be performed again. For example, the parameters for determining $C_R$ may be changed, the reference digital image may be changed, or the way in which wavelet coefficients for modification are selected and/or modified may be changed.

Third, post-processing unit 350 attempts to reduce the perceptual effects of one or more discontinuities that may exist by "feathering" (or, equivalently, smoothing) at the boundaries between M pixels and NM pixels, or between two M pixels that use different reference digital images (Ref1 and Ref2, respectively). Feathering may be applied, for example, and as explained below for several implementations, to locations containing one type of pixel (for example, to pixels on a single side of a transition boundary), or to locations containing multiple types of pixels (for example, to pixels within a neighborhood extending across a transition boundary between different types of pixels). Feathering is performed, in one implementation, along the vertical boundaries between two horizontally neighboring pixel areas and along the horizontal boundaries between two vertically neighboring pixel areas.

The sizes of the feather extents typically impact the rate at which the intensity values for the pixels at the boundaries blend from one value to another. Various techniques may be used to determine the size of the extents for each row or column corresponding to an NM/M (or Ref1/Ref2) pixel transition. In one implementation, the sizes of the feather extents are determined based on the intensity values of R, G, and B as well as the intensity values of the modified red image, $M1_R$. For example, assuming that $M1_R$ (i,j) is the red intensity value for the NM pixel at the NM/M transition after the red image has been processed by the modification unit, and $M1_R$(i,j+1) is the red intensity value for the M pixel at the NM/M transition after the red image has been processed by the modification unit, a value diff may be defined as:

$$\text{diff}=\text{abs}(M1_R(i,j)-M1_R(i,j+1)),$$

which is the absolute value of the red intensity difference between the NM and M red pixel values. In addition, a value diff2 may be defined to be 1 or 0 based on whether a particular metric is satisfied when it is applied to the (R, G, B) pixel intensity values at locations (i,j) and (i,j+1) as well as the $M1_R$ pixel intensity value at location (i,j+1). For example, the particular metric may be a function of abs($M1_R$(i,j+1)−R(i,j+1)), abs(G(i,j)−G(i,j+1)), and abs(B(i,j)−B(i,j+1)).

An extent can then be defined as:

$$E1=(\text{constant}*\text{diff}) \text{ if diff2}=1, \text{ or } 0 \text{ if diff2}=0,$$

where constant $>=0$, but typically is less than 1.

FIG. 16 provides a simplified example involving a portion of a single column, i. In FIG. 16, pixel (i,j) is an NM pixel and (i,j+1) is an M pixel. $M1_R$ (i,j)=130, $M1_R$ (i,j+1)=90, and diff=40. Also, assume diff2 is 1. Assuming "constant" has a value of 0.1, then E1=4 which includes $M1_R$ (i,j+1) through $M1_R$ (i,j+4).

The extent may be further refined based on the similarity of the adjacent pixel intensities with the same designations. In one implementation, continuing the above example, given an M pixel at location (i, j+1) and an extent E1, the following operations are performed for pixels (i, k), for j+1≦k≦=j+E1, where k is an integer:

1. Check whether the pixel (i, k) is the same designation type as the previous pixel (i, k−1), that is, an M pixel or an NM pixel.

2a. If operation 1 is not satisfied, skip to operation 4.

2b. Compare the (R, G, B) intensity values of pixel (i,k) to the (R, G, B) intensity values of pixel (i, k−1).

3. If the comparison in operation 2b satisfies a particular metric (which is different from the metric that yields diff2 described above), increment k and then return to operation 1.

4. If operation 1 is not satisfied or if the comparison in operation 2b does not satisfy a particular metric, the extent is defined as the set of pixels (i, k) that satisfied operation 3.

The above algorithm can be applied to the column shown in FIG. 16. In the first pass through the algorithm, k=j+2. In operation 1, pixel (i,j+2) is compared to pixel (i,j+1), and both are M pixels. In operation 2b, the (R,G,B) intensity values of pixel (i,j+2) are compared to the (R,G,B) intensity values of pixel (i,j+1). The comparison may be, for example, to determine the absolute value of a difference for each color component, in which case, the comparison yields a result of (3,3, 2) (that is, 128-125, 127-130, 118-116). In operation 3, the result of (3,3,2) is checked to determine if a metric is satisfied. The metric may be, for example, a maximum acceptable difference for each component, and the value of the maximum acceptable difference may be, for example, 6. In such an implementation, the metric is satisfied because the differences for each color component, that is, 3, 3, and 2, are less than the maximum acceptable difference of 6.

In the second pass through the algorithm, k=j+3. In operation 1, pixel (i,j+3) is compared to pixel (i,j+2), and both are M pixels. In operation 2b, assuming the comparison is the absolute difference in intensity values, the comparison yields a result of 7 (125-118) for the R component and 1 for both the G and B components. In operation 3, assuming the metric is a maximum difference of 5, the result of 7 fails to satisfy the metric. In operation 4, the extent is defined as pixels (i,j+1) and (i,j+2), which is smaller than the earlier determined extent of 4.

If the maximum acceptable difference had been 7 in the above example, then pixel (i,j+3) would have satisfied the metric and a third pass would have been made through the algorithm. In the third pass, however, pixel (i,j+4) would have failed operation 1 because pixel (i,j+4) is an NM pixel, so the extent would have ended at pixel (i,j+3), including pixels (i,j+1) through (i,j+3).

The feather extent can be extended across both M and NM pixel locations, across only M pixel locations, or across only NM pixel locations (or, analogously, across both Ref1 and Ref2 pixel locations, across only Ref1 pixel locations, or across only Ref1 pixel locations in the case where there is an Ref1/Ref2 boundary transition). If the feather extent is extended across the NM pixel locations as well as the M pixels, an analogous procedure to the operations described above, for example, may be applied to the NM pixels near the NM/M transition boundary.

Once the feather extent is obtained, the intensity values of the pixels within this extent may be modified. In one implementation, within the feather extent, new intensity values are obtained by linearly interpolating between the intensity values associated with the ending pixels of each feather extent. However, many techniques may be used to obtain the new intensity values within the feather extent.

Figure 17:
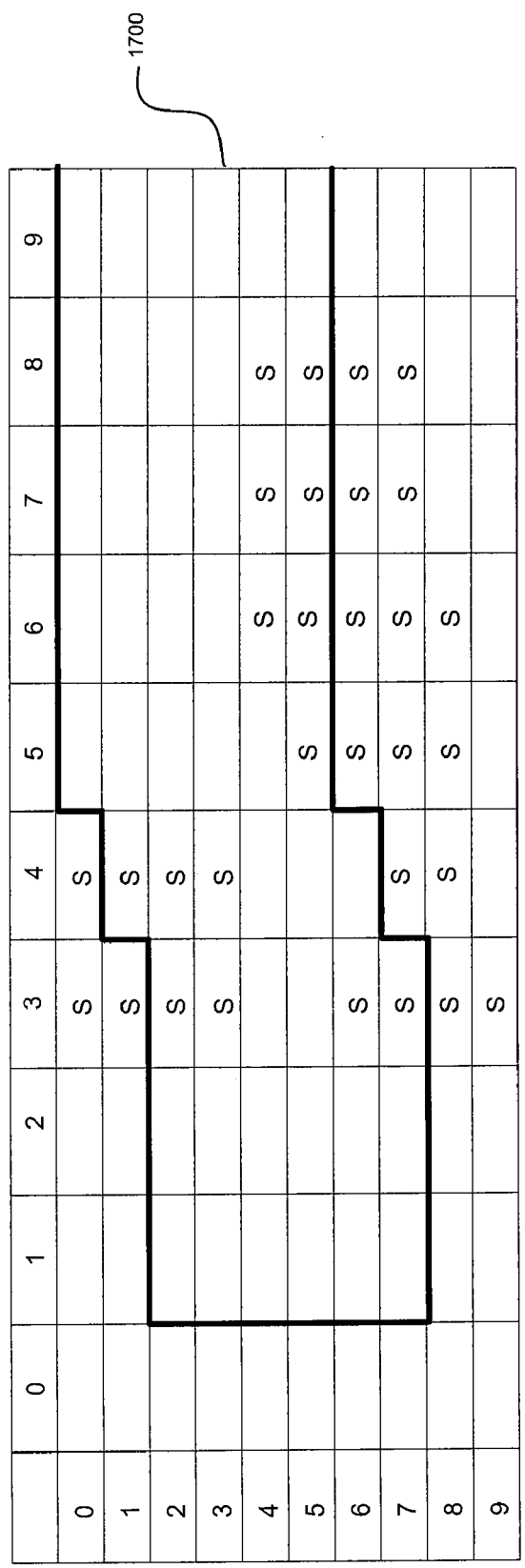
FIG. 17 is a classification map showing pixels that may be smoothed.

FIG. 17 provides a two-dimensional example 1700 identifying several pixels near the NM/M border transformation that are affected by the feathering scheme described above. For ease of viewing, the NM/M pixels are not labeled. Instead, the transition between the NM/M pixels is indicated by solid bold lines. The pixels affected by the feathering scheme in both the vertical and horizontal directions are labeled as 'S.'

As discussed briefly above, a one-dimensional wavelet transform may have been applied in only one direction by the modification unit 340 using a classification map that described edges in only one direction. In system 300, the unmodified red digital image R is used to obtain a new classification map in an orthogonal direction. The new classification map and the "old" $M2_R$ are received by the modification unit 340 which uses the new classification map to apply a one-dimensional wavelet transform in the orthogonal direction to the old $M2_R$. $M2_R$ is then modified to produce a new $M1_R$. The new $M1_R$ is sent to post-processing unit 350 where a final $M2_R$ is generated. Other implementations may combine the results of multiple passes, orthogonal or otherwise, in various ways.

In another implementation, as with the above, a one-dimensional wavelet transform is applied in only one direction by modification unit 340 using a classification map that describes edges in only one direction. However, in this other implementation, $M2_R$ is fed back to classification unit 330 where $M2_R$ is used in place of the red digital image R to obtain a new classification map that indicates M pixels related to edges in an orthogonal direction.

Composite Unit

Referring again to FIG. 3, system 300 also includes a composite unit 360 that receives $M2_R$ and the two higher resolution digital images, and combines these three digital images to produce a composite color image (frame). An optical printer, as previously described, may be used to combine the three digital images and produce the composite color image. Also, a laser film printer may be used to avoid the loss of resolution that is typically incurred in all three colors with an optical printer.

Additional Implementations

Referring again to digitization unit 310, in one implementation, I(x,y) represents the logarithm of the actual intensity value at pixel location (x,y). Other, implementations may (i) perform one or more of a variety of other transformations, such as, for example, positive-to-negative, in lieu of or in addition to the negative-to-positive transformation, (ii) may perform no transformation at all, (iii) may accept digitized data so as to obviate the need for digitization, and/or (iv) may accept composited data that can be digitized and from which separate digitized component data can then be extracted. For example, (iv) may include a composite dupe from film separations or a composite color image. Digitization unit 310 need only digitize two separations if a high resolution separation and a low resolution separation are determined (or designated) beforehand, or determined by digitization unit 310. Further, none of the other blocks in system 300 needs to receive a digital representation of an unused separation.

Referring again to classification unit 330, implementations may determine the reference digital image by, for example, simply selecting the green or blue digital image, or by selecting the digital image that meets a particular criterion, such as, for example, the digital image that has the highest resolution. Resolution may be determined using a variety of techniques. For example, frequency information from a transformation may be used to determine the high frequency content of a digital image or separation, or spatial domain techniques may be used to examine edge slopes or other edge features indicative of high frequency or high resolution. Note that resolution determination techniques also may be applied to determine which separation or digital image has the lowest resolution, although in filming applications it typically may be assumed that the red separation has the lowest resolution.

Additionally, the reference digital image need not be fixed for a given image (frame). For example, the reference digital image may vary depending on the edge or pixel being considered. Further, if it is determined that a particular edge in the lower resolution image contains a matching edge in more than one of the other digital images, then the reference digital image may be iterated through the two possibilities in multiple passes through classification unit 330 to determine which digital image, or the combination, is a more preferred reference. In one implementation, a set of connected edge pixels always use the same reference digital image. This reference digital image may be determined based on which reference digital image each of the edge pixels selected, that is, the reference digital image selected by the majority of the edge pixels. In these examples in which more than one reference digital image can be used within a given image, the classification unit 320 also may specify which one or more of the reference digital images are to provide the information that will be used to modify the selected portions of the lower resolution image. The specification of the reference digital image(s) and the identification of the selected portions to which a given reference digital image applies may be provided in the classification map, as discussed earlier, or elsewhere.

Other implementations determine the low resolution digital image for different portions or features of the frame. In one such implementation, multiple passes are performed through system 300 with each pass processing features in a particular digital image that have the lowest resolution among the three digital images.

Various criteria, such as those described above, may be used to determine the resolution of the digital images, or the separations. Such criteria also may include, for example, information obtained from wavelet, or other, transformations. If two digital images have similar resolutions, a reference digital image for a particular edge may be determined between the two by, for example, selecting the digital image with the lower average intensity value at the ending of the edge extent. A digital image may be selected as the reference even if the resolution is not the highest. For example, a digital image may possess some other property that makes the digital image suitable for use as a reference in a particular application.

As stated earlier, classification unit 330 may use another feature in addition to, or in lieu of, an edge to determine which of the pixels to modify. Examples of such features include characteristics of intensity values (for example, intensity values above a particular threshold), object shapes, wavelet coefficient values, areas previously identified as misaligned by some other image processing algorithm, and information from adjacent frames that indicates that a corresponding region in that frame had pixels that were modified (that is, temporally-based features). Temporally-based features may use information from one or more frames that precede, or succeed, or both precede and succeed the frame under consideration in time. Such implementations may take advantage of the fact that much of a frame, including edges and other features, may remain constant from frame to frame.

Alternate implementations of classification unit 330 may perform process 400 using one or more of a variety of edge detection methods in addition to, or in lieu of, the Canny filter mentioned earlier. For example, process 400 may obtain a set of edges by identifying transition pixels at a boundary between higher intensity pixels and lower intensity pixels. Higher intensity pixels may be differentiated from lower intensity pixels by, for example, designating a pixel as higher intensity if the pixel's intensity value is above a threshold, and designating the pixel as lower intensity otherwise. Such a threshold comparison may be used for R, G, and B images.

Various functions performed by classification unit 330, or other units, need not be performed in all implementations. For example, continuity need not be provided among the M or PM pixels in an edge map, and spurious M and PM pixels need not be removed from an edge map. In addition, during the intermediate steps of the various functions performed by classification unit 330, pixels may be restricted to only the M or NM labels (that is, the PM label need not be assigned to any pixels).

Various functions performed by classification unit 330 may also be performed multiple times in some implementations. For example, continuity and/or pruning steps may be applied multiple times, and at various different stages, during the process performed by classification unit 330. In one alternate implementation, continuity and/or pruning steps may be applied after an initial set of edges (or edge map) is generated but before the various criteria tests are applied to the edges in the non-reference and reference digital images in order to determine whether they match (that is, whether they should be modified).

The slope of intensity-value changes may be used as a descriptive criterion in operations 420 and 430 of process 400. Slope information also may be used in other contexts or for other purposes, such as, for example, to determine edge extent and to determine if edges match (by comparing slope information).

Various criteria may also be used to determine whether particular M pixels are to be treated differently than other M pixels during the modification step. When it is determined that particular edges or edge pixels are to be treated differently, this information also may be provided in the classification map or elsewhere. For example, the classification unit may determine different scaling factors to use during the modification operation based on the properties of the edge pixel and its associated extent and the properties of the corresponding edge pixel and its associated extent in the reference digital image.

Referring again to modification unit 340, the resolution content of the images may be modified using time domain analysis, frequency domain analysis, and/or wavelet domain analysis. The implementation described above uses wavelet transformations and may limit the extent of the resolution modifications by ensuring in the time domain that no NM pixels are modified. Other transformations may be used, particularly transformations for which the frequency or resolution information is correlated with spatial or time information, such as, for example, the short-term Fourier transform. Further, different types of transformations may be used within a given implementation.

Additionally, temporally-based methods, such as, for example, frame-to-frame analysis, which was mentioned above in the context of classification, may be used to modify an image (frame). Such frame-to-frame analysis may include, for example, many of the techniques already described.

When wavelet (or other) transformations are used, the coefficients may be combined in myriad ways, such as, for example, by copying as described above, or by performing scaling or other functions. Further, the coefficients may be modified based on other factors of the subbands. Additionally, given the spreading effect of a coefficient, one implementation purposefully changes coefficients that are not associated or correlated with a particular M pixel but that are expected to impact the particular M pixel through the spreading effect. Implementations may perform transformations on subsets of the digital images, as opposed to performing transformations on the entire digital image.

The wavelet transformation used in one implementation of modification unit 340 is a digital wavelet transformation that uses subsampling. Other implementations of wavelet transformations, or other transformations, may be used.

Referring again to post-processing unit 350, various other operations may be performed to verify or improve the resolution obtained. For example, post-processing unit 350 may allow NM pixels to be modified and/or may ensure that M pixels were modified in a beneficial manner. In contrast, it also should be clear that implementations need not perform any post-processing.

Implementations need not process every edge in the red digital image. For example, one implementation only attempts to modify edges in the red digital image that have a resolution below a specified threshold or that have a resolution that is lower than the corresponding edge in the reference digital image by a specified threshold.

The implementations and techniques described herein can be applied to a variety of applications in which distortion that results from multiple separations of differential resolution needs to be reduced. Examples include spectral and non-spectral separations. Spectral separations are used, for example, in: (1) color film applications capturing, for example, different color frequencies, (2) astronomical applications capturing, for example, radio frequencies and/or optical frequencies, and (3) medical applications capturing, for example, different magnetic (MRI), X-ray, and sound (ultrasound) frequencies. As these examples illustrate, spectral separations may be captured from various frequency sources, including, for example, electromagnetic and sound waves. Non-spectral separations may be obtained from, for example, variations in pressure, temperature, energy, or power.

The implementations and techniques described herein also may be applied to composite color images, that is, to images that have more than one color component. For example, a video image may have red, green, and blue components combined into one "composite" image. These components may be separated to form separations, and one or more of the implementations and techniques described herein may be applied to the separations.

Implementations and features may be implemented in a process, a device, or a combination of devices. Such a device may include, for example, a computer or other processing device capable of processing instructions using, for example, a processor, a programmable logic device, an application specific integrated circuit, or a controller chip.

Instructions may be in the format of, for example, software or firmware. Instructions may be stored in a computer readable medium, such as, for example, a disk, a random-access memory, or a read-only memory.

Referring to FIG. 18, a system 1800 for implementing various disclosed features includes a processing device 1810 coupled to a computer readable medium 1820. Computer readable medium 1820 stores instructions 1830 to be processed by processing device 1810, wherein such processing implements the various disclosed features.

A separation or digital image may be selected, for example, by being accessed. Selecting a separation or digital image may be done, for example, by selecting a file or a representation, such as, for example, a display, of the separation or digital image. Other representations may be provided, for example, by various user interfaces.

The digital images described above include information that generally spans the same object. For example, the red, blue, and green digital images each contain information (red information, blue information, or green information) that spans the entire frame. Such information (red, blue, and green) can be termed "complementary" information because the information relates to the same object. Other implementations may use digital images that span a different object, such as, for example, an area in a scene being filmed, a portion of a body, or a portion of the sky.

Other implementations may use digital images in which only a portion of each digital image spans the desired object. For example, a red separation might be used that only captures foreground information, and a reference separation might be used that captures both foreground and background information.

Implementations also may use digital images in which the desired object is captured from a different angle or distance. Such a situation may occur when cameras at different distances or angles are used to film the different color components, or different telescopes are used to photograph the same general portion of the sky.

Various implementations perform, for example, one or more operations, functions, or features automatically. Automatic refers to being performed substantially without human intervention, that is, in a substantially non-interactive manner. Examples of automatic processes include a process that is started by a human operator and then runs by itself. Automatic implementations may use, for example, electronic, optical, mechanical, or other technologies.

The functional blocks, operations, and other disclosed features may be combined and performed in different orders and combinations, and may be augmented with other features not explicitly disclosed. Reference to a portion of an image or other object may include the entire image or other object.

A number of implementations have been described. Nevertheless, it will be understood that various modifications may be made without departing from the spirit and scope of the claims. Accordingly, other implementations are within the scope of the following claims.

What is claimed is:

1. A method comprising:
accessing a first image of a scene that (1) is associated with a first color separation that was extracted from a composite color image, and (2) includes a first region;
accessing a second image of at least a portion of the scene that (1) is associated with a second color separation that was extracted from the composite color image, and (2) includes a second region that corresponds to the first region;
identifying a feature that is in both the first region and the second region;
determining, based on the first image, a first set of data characterizing a particular aspect of the feature;
determining, based on the second image, a second set of data characterizing the particular aspect of the feature;
selecting one or more data elements of the second set of data; and
modifying each of the selected one or more data elements of the second set of data based on corresponding data elements of the first set of data.

2. The method of claim 1 wherein:
the feature comprises an edge,
the particular aspect of the feature comprises spectral information for the edge, and
the first set of data characterizing the particular aspect comprises a set of coefficients of a transformation of the first region.

3. The method of claim 1 wherein the first region and the second region are derived from a common sub-portion of the composite color image.

4. The method of claim 1 wherein the first image and the second image populate to a common sub-portion of screen real estate on a display upon which the screen is displayed.

5. A method comprising:
accessing a first image of a scene that (1) is associated with a first color separation that was extracted from a composite color image, and (2) includes a first region;
determining, based on the first image, a property for the first region within the first image;
accessing a second image of at least a portion of the scene that (1) is associated with a second color separation that was extracted from the composite color image, and (2) includes a second region that corresponds to the first region;
determining, based on the second image, the property for the second region within the second image and that corresponds to the first region; and
modifying the property determined for the second region based on the property determined for the first region.

6. The method of claim 5 wherein:
the first and second images are digital images and the first and second regions include pixels, and
determining the property for the first and second regions comprises determining a property that characterizes pixels in the first and second regions, respectively.

7. The method of claim 6 further comprising modifying pixels in the second region based on the property determined for the first region.

8. The method of claim 5 wherein modifying the property determined for the second region comprises setting the property determined for the second region equal to a function of the property determined for the first region.

9. The method of claim 5 wherein determining the property for the second region comprises determining a frequency-based property for the second region.

10. The method of claim 9 wherein determining the frequency-based property comprises determining a coefficient of a transformation, into a frequency domain representation, of at least a portion of the second region.

11. The method of claim 10 wherein determining the coefficient of the transformation comprises determining a coefficient of a wavelet transformation of at least the portion of the second region.

12. The method of claim 11 wherein modifying the property determined for the second region comprises replacing the determined coefficient of the wavelet transformation of at least the portion of the second region with a function of a coefficient of a wavelet transformation of at least a portion of the first region.

13. The method of claim 12 wherein replacing the determined coefficient comprises replacing the determined coefficient with a scaled value of the coefficient of the wavelet transformation of at least the portion of the first region.

14. The method of claim 5 wherein determining the property for the second region comprises:
identifying a feature that is in the portion of the scene; and
determining measurable criteria related to the feature in the second image.

15. The method of claim 14 wherein:
the feature comprises an edge, and identifying the feature comprises identifying the edge, and the measurable criteria comprise spectral information, and determining the measurable criteria comprises determining spectral information for the edge.

16. The method of claim 15 wherein the spectral information corresponds to red coloration in the portion of the scene, and modifying the property determined for the second region comprises modifying the spectral information corresponding to red coloration in the portion of the scene, thereby reducing red fringing of the edge.

17. The method of claim 5 wherein:
the property comprises a set of data characterizing a particular aspect,
determining the property for the first region comprises determining a first set of data characterizing the particular aspect of the first region, and
determining the property for the second region comprises determining a second set of data characterizing the particular aspect of the second region.

18. The method of claim 17 further comprising selecting one or more data elements of the second set of data, and wherein modifying the property determined for the second region based on the property determined for the first region comprises setting each of the selected one or more data elements of the second set of data equal to a function of the corresponding data elements of the first set of data.

19. The method of claim 18 wherein:
each of the selected one or more data elements comprises a separate coefficient of a transformation of the second region, and
setting each of the selected one or more data elements equal to a function comprises setting each of the one or more separate coefficients equal to a function of a corresponding coefficient of a transformation of the first region.

20. The method of claim 19 wherein:
the function of the corresponding coefficient is equal to the corresponding coefficient, and
setting each of the one or more separate coefficients equal to the function of the corresponding coefficient comprises setting each of the one or more separate coefficients equal to the corresponding coefficient of the transformation of the first region.

21. The method of claim 19 wherein:
the function of the corresponding coefficient scales a value of the corresponding coefficient, and
setting each of the one or more separate coefficients equal to the function of the corresponding coefficient comprises setting each of the one or more separate coefficients equal to a scaled value of the corresponding coefficient of the transformation of the first region.

22. The method of claim 5 wherein accessing the first image comprises accessing a red separation that was extracted from a composite color image.

23. The method of claim 5 wherein the first region and the second region are derived from a common sub-portion of the composite color image.

24. The method of claim 5 wherein the first image and the second image populate to a common sub-portion of screen real estate on a display upon which the screen is displayed.

25. An apparatus comprising a computer readable medium that includes instructions for performing at least the following:
accessing a first image of a scene that (1) is associated with a first color separation that was extracted from a composite color image, and (2) includes a first region;
accessing a second image of at least a portion of the scene that (1) is associated with a second color separation that was extracted from the composite color image, and (2) includes a second region that corresponds to the first region;
identifying a feature that is in both the first region and the second region;
determining, based on the first image, a first set of data characterizing a particular aspect of the feature;
determining, based on the second image, a second set of data characterizing the particular aspect of the feature;
selecting one or more data elements of the second set of data; and
modifying each of the selected one or more data elements of the second set of data based on corresponding data elements of the first set of data.

26. An apparatus comprising a computer readable medium that includes instructions for performing at least the following:
accessing a first image of a scene that (1) is associated with a first color separation that was extracted from a composite color image, and (2) includes a first region;
determining, based on the first image, a property for the first region within the first image;
accessing a second image of at least a portion of the scene that (1) is associated with a second color separation that was extracted from the composite color image, and (2) includes a second region that corresponds to the first region;
determining, based on the second image, the property for the second region within the second image and that corresponds to the first region; and
modifying the property determined for the second region based on the property determined for the first region.

* * * * *